United States Patent
Zhang

(10) Patent No.: US 11,088,733 B2
(45) Date of Patent: Aug. 10, 2021

(54) METHOD AND DEVICE IN UE AND BASE STATION FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 17/012,029

(22) Filed: Sep. 3, 2020

(65) Prior Publication Data

US 2020/0403660 A1 Dec. 24, 2020

Related U.S. Application Data

(63) Continuation of application No. PCT/CN2019/078020, filed on Mar. 13, 2019.

(30) Foreign Application Priority Data

Mar. 26, 2018 (CN) .......................... 201810254690.1

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0626* (2013.01); *H04L 5/0007* (2013.01); *H04L 5/0057* (2013.01); *H04W 16/14* (2013.01)

(58) Field of Classification Search
CPC ............................ H04B 7/0632; H04B 7/0417
See application file for complete search history.

(56) References Cited

U.S. PATENT DOCUMENTS

| | | | |
|---|---|---|---|
| 9,294,172 B2* | 3/2016 | Park | H04B 7/0456 |
| 2008/0069031 A1* | 3/2008 | Zhang | H04L 5/0028 |
| | | | 370/328 |

(Continued)

FOREIGN PATENT DOCUMENTS

| | | |
|---|---|---|
| CN | 103580819 A | 2/2014 |
| CN | 105991209 A | 10/2016 |
| EP | 2624472 A2 | 8/2013 |

OTHER PUBLICATIONS

ISR in application PCT/CN2019/078020 dated May 27, 2019.

*Primary Examiner* — Kevin Kim

(57) ABSTRACT

A method and a device in UE and base station used for wireless communications are disclosed in the present disclosure. The UE receives first information, the first information being used to indicate N CSI Reporting Settings, and the N CSI Reporting Settings respectively being associated with N radio resources; receives second information, the second information being used to indicate J radio resource(s); and transmits M piece(s) of CSI in a first radio resource, the M piece(s) of CSI respectively corresponding to M CSI Reporting Setting(s) among the N CSI Reporting Settings, and the first radio resource being one of the J radio resource(s). The first radio resource corresponds to a first antenna port group, the N radio resources respectively correspond to N antenna port groups, and whether the N antenna port groups are spatially associated with the first antenna port group is used for determining the M CSI Reporting Settings.

20 Claims, 15 Drawing Sheets

(51) Int. Cl.
*H04L 5/00* (2006.01)
*H04W 16/14* (2009.01)

(56) References Cited

U.S. PATENT DOCUMENTS

| | | | |
|---|---|---|---|
| 2016/0112099 A1* | 4/2016 | Lee | H04B 7/0413 370/252 |
| 2018/0343046 A1* | 11/2018 | Park | H04B 7/0456 |
| 2020/0037275 A1* | 1/2020 | Liu | H04L 5/0048 |

* cited by examiner

Transmitting beam of first given antenna port group

Transmitting beam of second given antenna port group

Transmitting beam of first given antenna port group

Transmitting beam of second given antenna port group

Transmitting beam of first given antenna port group

Transmitting beam of second given antenna port group

Transmitting beam of first given antenna port group

Transmitting beam of second given antenna port group

Transmitting beam of given antenna port

Receiving beam of given energy detection

Transmitting beam of given antenna port

Receiving beam of given energy detection

METHOD AND DEVICE IN UE AND BASE STATION FOR WIRELESS COMMUNICATION

CROSS REFERENCE TO RELATED APPLICATIONS

This application is a continuation of International Application No. PCT/CN2019/078020, filed Mar. 13, 2019, claims the priority benefit of Chinese Patent Application No. 201810254690.1, filed on Mar. 26, 2018, the full disclosure of which is incorporated herein by reference.

BACKGROUND

Technical Field

The present disclosure relates to transmission methods and devices in wireless communication systems, and in particular to a communication method and device supporting data transmission on Unlicensed Spectrum.

Related Art

In wireless communication systems that support multi-antenna transmissions, it is a commonly used technique for a User Equipment (UE) to generate and feedback Channel Status Information (CSI) based on channel and interference measurements to assist a base station in multi-antenna processing. In LTE, CSI comprises at least one of a CSI-RS Resource Indicator (CRI), Rank indication (RI), a Precoding matrix indicator (PMI) or a Channel quality indicator (CQI).

Massive Multi-Input Multi-Output (MIMO) is a significant part of 5G New Radio (NR) Access Technology. It has been agreed in 5G NR standards that a higher-layer signaling configures one or two multi-CSI Physical Uplink Control CHannel (PUCCH) resources, when there are multiple CSI reportings conflicting with one another, namely, any two CSI reportings occupy at least one same multicarrier symbol, a multi-CSI PUCCH resource can be selected to carry these pieces of CSI in conflict. In massive MIMO, multiple antennas form through beamforming a beam pointing in a specific spatial orientation to improve communication quality. Considering the impacts of beamforming, a further study needs to be conducted on the conflict dissolution mechanism of multi-CSI reporting.

SUMMARY

Inventors find through researches that massive MIMO will be widely applied in an NR system, when multiple CSI reportings are in conflict with each other, how to dissolve conflict and acquire as much CSI as possible becomes a key issue to be solved.

To address the above problem, the present disclosure discloses a solution. It should be noted that the embodiments of the present disclosure and the characteristics in the embodiments may be mutually combined if no conflict is incurred.

The present disclosure provides a method in a User Equipment (UE) for wireless communications, comprising:

receiving first information, the first information being used to indicate N Channel Status Information (CSI) Reporting Settings, the N CSI Reporting Settings respectively being associated with N radio resources, and N being a positive integer greater than 1;

receiving second information, the second information being used to indicate J radio resource(s), and J being a positive integer; and transmitting M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N;

herein, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

In one embodiment, a problem to be solved in the present disclosure is that: in NR system, when multiple CSI reportings are conflicting, i.e., any two CSI reportings occupy at least one same multicarrier symbol, part of or all pieces of CSI in the multiple CSI reportings are carried by a candidate radio resource (that is, multi-CSI PUCCH resource). These multiple CSI reportings may be for different base stations or Transmit-Receive Points (TRPs), so their respective transmitting beams may point to different base stations or TRPs. Against such backdrop, how to select one or more resources from a plurality of configured candidate radio resources and which CSI of the multiple CSI reportings will be carried by each selected candidate radio resource remain to be solved.

In one embodiment, the essence of the above method lies in that N CSI Reporting Settings respectively correspond to N CSI reportings, N radio resources are resources respectively reserved for the N CSI reportings, and N antenna port groups respectively indicate transmitting beams of the N CSI reportings; J radio resources are J candidate radio resources, i.e., J multi-CSI PUCCH resources, a first radio resource is one of the J candidate radio resources, and a first antenna port group indicates a transmitting beam for the first radio resource; when conflicts occur among the N CSI reportings, the first radio resource is used to carry M CSI reporting(s) of the N CSI reportings, and the selection of the M CSI reporting(s) depends on the spatial relationship between the transmitting beams of the N CSI reportings and the transmitting beam for the first radio resource. An advantage of employing the above method is that these N CSI reportings are classified according to a transmitting beam for a candidate radio resource, thereby allowing a base station or TRP to which the transmitting beam for the candidate radio resource points to acquire CSI corresponding to the base station or the TRP as much as possible among the multiple pieces of CSI.

In one embodiment, the above method is characterized in that each of M antenna port group(s) among the N antenna port groups that respectively corresponds(correspond) to the M CSI Reporting Setting(s) is spatially associated with the first antenna port group.

In one embodiment, the above method is advantageous in that a base station or a TRP corresponding to M CSI reporting(s) is the same as a base station or a TRP to which a transmitting beam for a first radio resource points to, thus enabling the CSI to be reported to a corresponding base station or TRP accurately.

According to one aspect of the present disclosure, the above method is characterized in that when at least one antenna port group of M antenna port group(s) among the N antenna port groups that respectively corresponds(correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

In one embodiment, the above method is advantageous in that among the N CSI reportings each CSI reporting whose corresponding base station or TRP is the same as a base station or TRP to which a transmitting beam for a first radio resource points belongs to M CSI reporting(s), so that the base station or TRP to which the transmitting beam for the first radio resource points can acquire all of CSI corresponding to the base station or the TRP among the multiple pieces of CSI.

According to one aspect of the present disclosure, the above method is characterized in comprising:

transmitting K piece(s) of CSI in a second radio resource, the K piece(s) of CSI respectively corresponding to K CSI Reporting Setting(s) among the N CSI Reporting Settings other than the M CSI Reporting Setting(s), K being a positive integer no greater than N−M;

herein, the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group.

In one embodiment, the essence of the above method lies in that K CSI Reporting Setting(s) corresponds(correspond) to K CSI reporting(s) of the N CSI reportings, any of which is different from the M CSI reporting(s). A second radio resource is a candidate radio resource other than a first radio resource, and a UE carries the M CSI reporting(s) and the K CSI reporting(s) respectively in these two candidate radio resources. An advantage of the above method is to classify the N CSI reportings in accordance with transmitting beams for multiple candidate radio resources, thus enabling a base station or TRP to which each candidate radio resource's transmitting beam points to acquire all or part of CSI of the base station or the TRP from the multiple pieces of CSI.

According to one aspect of the present disclosure, the above method is characterized in comprising:

performing an access detection to determine the first radio resource out of the J radio resources;

herein, the J is greater than 1.

In one embodiment, the essence of the above method lies in that J radio resources respectively correspond to J various transmitting beams, and a first radio resource is the one and only radio resource of the J radio resources that is capable of accessing a channel employing a corresponding transmitting beam. An advantage of the above method is that beam-based channel access can reflect the interference situation in a specific beam direction more truthfully, thus enhancing Unlicensed Spectrum sharing.

According to one aspect of the present disclosure, the above method is characterized in that a reference CSI Reporting Setting is a CSI Reporting Setting with a highest reference priority among the N CSI Reporting Settings, and a reference antenna port group is one of the N antenna port groups corresponding to one of the N radio resources that is associated with the reference CSI Reporting Setting, the reference antenna port group being associated with the first antenna port group.

In one embodiment, the essence of the above method lies in that a transmitting beam for a first radio resource can be dynamically determined by a transmitting beam of one CSI reporting with the highest priority among N conflicting CSI reportings.

According to one aspect of the present disclosure, the above method is characterized in that the second information is also used to indicate J antenna port groups, the J radio resources respectively correspond to the J antenna port groups, and the first antenna port group is an antenna port group corresponding to the first radio resource among the J antenna port groups.

In one embodiment, the essence of the above method lies in that a transmitting beam for a first radio resource may be semi-statically configured.

According to one aspect of the present disclosure, the above method is characterized in comprising:

receiving third information;

herein, the third information is used to indicate configuration information of the N radio resources.

The present disclosure provides a method in a base station for wireless communications, comprising:

transmitting first information, the first information being used to indicate N Channel Status Information (CSI) Reporting Settings, the N CSI Reporting Settings respectively being associated with N radio resources, and N being a positive integer greater than 1;

transmitting second information, the second information being used to indicate J radio resource(s), and J being a positive integer; and receiving M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N;

herein, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

According to one aspect of the present disclosure, the above method is characterized in that each of M antenna port group(s) among the N antenna port groups that respectively corresponds(correspond) to the M CSI Reporting Setting(s) is spatially associated with the first antenna port group.

According to one aspect of the present disclosure, the above method is characterized in that when at least one antenna port group of M antenna port group(s) among the N antenna port groups that respectively corresponds(correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

According to one aspect of the present disclosure, the above method is characterized in comprising:

receiving K piece(s) of CSI in a second radio resource, the K piece(s) of CSI respectively corresponding to K CSI Reporting Setting(s) among the N CSI Reporting Settings other than the M CSI Reporting Setting(s), K being a positive integer no greater than N−M;

herein, the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group.

According to one aspect of the present disclosure, the above method is characterized in comprising:

monitoring the J radio resources to determine the first radio resource;

herein, a receiver of the first information performs an access detection to determine the first radio resource out of the J radio resources, J being greater than 1.

According to one aspect of the present disclosure, the above method is characterized in that a reference CSI Reporting Setting is a CSI Reporting Setting with a highest reference priority among the N CSI Reporting Settings, and a reference antenna port group is one of the N antenna port groups corresponding to one of the N radio resources that is associated with the reference CSI Reporting Setting, the reference antenna port group being associated with the first antenna port group.

According to one aspect of the present disclosure, the above method is characterized in that the second information is also used to indicate J antenna port groups, the J radio resources respectively correspond to the J antenna port groups, and the first antenna port group is an antenna port group corresponding to the first radio resource among the J antenna port groups.

According to one aspect of the present disclosure, the above method is characterized in comprising:

transmitting third information;

herein, the third information is used to indicate configuration information of the N radio resources.

The present disclosure provides a UE for wireless communications, comprising:

a first receiver, which receives first information, the first information being used to indicate N Channel Status Information (CSI) Reporting Settings, the N CSI Reporting Settings respectively being associated with N radio resources, and N being a positive integer greater than 1; and receives second information, the second information being used to indicate J radio resource(s), and J being a positive integer; and a first transmitter, which transmits M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N;

herein, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

In one embodiment, the above UE is characterized in that each of M antenna port group(s) among the N antenna port groups that respectively corresponds(correspond) to the M CSI Reporting Setting(s) is spatially associated with the first antenna port group.

In one embodiment, the above UE is characterized in that when at least one antenna port group of M antenna port group(s) among the N antenna port groups that respectively corresponds(correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

In one embodiment, the above UE is characterized in that the first transmitter also comprises transmitting K piece(s) of CSI in a second radio resource, the K piece(s) of CSI respectively corresponding to K CSI Reporting Setting(s) among the N CSI Reporting Settings other than the M CSI Reporting Setting(s), K being a positive integer no greater than N−M; herein, the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group.

In one embodiment, the above UE is characterized in that the first receiver also performs an access detection to determine the first radio resource out of the J radio resources; herein, J is greater than 1.

In one embodiment, the above UE is characterized in that a reference CSI Reporting Setting is a CSI Reporting Setting with a highest reference priority among the N CSI Reporting Settings, and a reference antenna port group is one of the N antenna port groups corresponding to one of the N radio resources that is associated with the reference CSI Reporting Setting, the reference antenna port group being associated with the first antenna port group.

In one embodiment, the above UE is characterized in that the second information is also used to indicate J antenna port groups, the J radio resources respectively correspond to the J antenna port groups, and the first antenna port group is an antenna port group corresponding to the first radio resource among the J antenna port groups.

In one embodiment, the above UE is characterized in that the first receiver also receives third information; herein, the third information is used to indicate configuration information of the N radio resources.

The present disclosure provides a base station for wireless communications, comprising:

a second transmitter, which transmits first information, the first information being used to indicate N Channel Status Information (CSI) Reporting Settings, the N CSI Reporting Settings respectively being associated with N radio resources, and N being a positive integer greater than 1; and transmits second information, the second information being used to indicate J radio resource(s), and J being a positive integer; and a second receiver, which receives M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N;

herein, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

In one embodiment, the above base station is characterized in that each of M antenna port group(s) among the N antenna port groups that respectively corresponds(correspond) to the M CSI Reporting Setting(s) is spatially associated with the first antenna port group.

In one embodiment, the above base station is characterized in that when at least one antenna port group of M antenna port group(s) among the N antenna port groups that respectively corresponds(correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

In one embodiment, the above base station is characterized in that the second receiver also receives K piece(s) of CSI in a second radio resource, the K piece(s) of CSI respectively corresponding to K CSI Reporting Setting(s) among the N CSI Reporting Settings other than the M CSI Reporting Setting(s), K being a positive integer no greater than N−M; herein, the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group.

In one embodiment, the above base station is characterized in that the second receiver also monitors the J radio resources to determine the first radio resource; herein, a receiver of the first information performs an access detection to determine the first radio resource out of the J radio resources, J being greater than 1.

In one embodiment, the above base station is characterized in that a reference CSI Reporting Setting is a CSI Reporting Setting with a highest reference priority among the N CSI Reporting Settings, and a reference antenna port group is one of the N antenna port groups corresponding to one of the N radio resources that is associated with the reference CSI Reporting Setting, the reference antenna port group being associated with the first antenna port group.

In one embodiment, the above base station is characterized in that the second information is also used to indicate J antenna port groups, the J radio resources respectively correspond to the J antenna port groups, and the first antenna port group is an antenna port group corresponding to the first radio resource among the J antenna port groups.

In one embodiment, the above base station is characterized in that the second transmitter also transmits third information; herein, the third information is used to indicate configuration information of the N radio resources.

In one embodiment, the present disclosure has the following advantages over the prior art:

If only one candidate radio resource is selected from multiple candidate radio resources to carry part or all of CSI in N conflicting CSI reportings, the N conflicting CSI reportings are classified according to a transmitting beam for the candidate radio resource, thus enabling a base station or TRP to which the transmitting beam for the candidate radio resource points to acquire as much CSI corresponding to the base station or TRP as possible among the multiple pieces of CSI.

If only one candidate radio resource is selected from multiple candidate radio resources to carry part or all of CSI in N conflicting CSI reportings, the candidate radio resource not only carries all CSI reporting(s) to a corresponding base station or TRP, but also carries part of or all CSI reporting(s) to other base station(s) or TRP(s).

If N conflicting CSI reportings are carried by multiple candidate radio resources, the N conflicting CSI reportings are classified according to transmitting beams respectively for the candidate radio resources, thus enabling a base station or TRP to which each candidate radio resource's transmitting beam points to acquire all or part of CSI corresponding to the base station or the TRP among the multiple pieces of CSI, so that the CSI can be reported right to the corresponding base station or the TRP, and the conflicts among multiple CSI reportings can be addressed effectively.

If N conflicting CSI reportings are carried by multiple candidate radio resources, each candidate radio resource only carries all CSI reportings to a corresponding base station or TRP rather than any CSI reporting to another base station or TRP.

A transmitting beam for a candidate radio resource may be semi-statically configured, or may be determined dynamically by a transmitting beam for one of N conflicting CSI reportings that has the highest priority.

If beam-based channel access is employed, any candidate radio resource used to carry part of or all CSI reportings among N conflicting CSI reportings is one of multiple candidate radio resources that have access to a channel by using a corresponding transmitting beam; the beam-based channel access can more truthfully reflect the interference in a specific beam direction while enhancing sharing of Unlicensed Spectrum.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
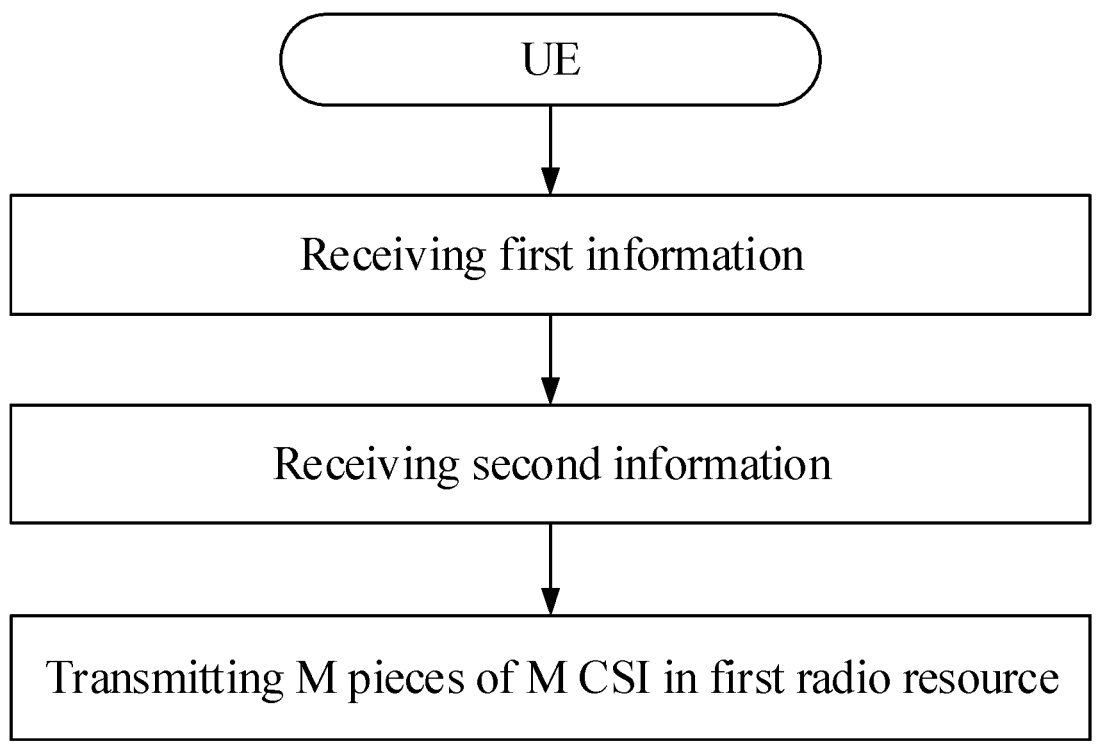
FIG. 1 illustrates a flowchart of first information, second information, a first radio resource and M piece(s) of CSI according to one embodiment of the present disclosure.

Embodiment 1 illustrates a flowchart of first information, second information, a first radio resource and M piece(s) of CSI, as shown in FIG. 1.

In one embodiment, the UE in the present disclosure receives first information, the first information being used to indicate N Channel Status Information (CSI) Reporting Settings, the N CSI Reporting Settings respectively being associated with N radio resources, and N being a positive integer greater than 1; and receives second information, the second information being used to indicate J radio resource(s), and J being a positive integer; and transmits M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N; herein, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

In one embodiment, the first information explicitly indicates N CSI Reporting Settings.

In one embodiment, the first information implicitly indicates N CSI Reporting Settings.

In one embodiment, the first information is semi-statically configured.

In one embodiment, the first information is carried by a higher-layer signaling.

In one embodiment, the first information is carried by a Radio Resource Control (RRC) signaling.

In one embodiment, the first information comprises one or more Information Elements (IE) in an RRC signaling.

In one embodiment, the first information comprises all or part of an IE in an RRC signaling.

In one embodiment, the first information comprises multiple IEs in an RRC signaling.

In one embodiment, each of reporting Time Domain behaviors respectively corresponding to the N CSI Reporting Settings is Periodic report.

In one embodiment, each of reporting Time Domain behaviors respectively corresponding to the N CSI Reporting Settings is Semi-persistent report.

In one embodiment, each of reporting Time Domain behaviors respectively corresponding to the N CSI Reporting Settings is either Periodic reporting or Semi-persistent reporting.

In one embodiment, a semi-persistent CSI reporting is activated and deactivated by a Medium Access Control (MAC) Control Element (CE) signaling.

In one embodiment, a given CSI Reporting Setting is any CSI Reporting Setting of the N CSI Reporting Settings, and the given CSI Reporting Setting comprises a Reporting Setting index, CSI, a Cell Identity, reporting Time Domain behavior, CSI Type, codebook configuration and reporting Frequency Domain granularity, reporting period as well as time-domain offset.

In one subembodiment of the above embodiment, if the reporting Time Domain behavior of the given CSI Reporting Setting is periodic reporting or semi-persistent reporting, the given CSI Reporting Setting comprises the reporting period and the time-domain offset.

In one subembodiment of the above embodiment, if the reporting Time Domain behavior of the given CSI Reporting Setting is aperiodic, the given CSI Reporting Setting only comprises the time-domain offset between the reporting period and the time-domain offset.

In one embodiment, a given CSI Reporting Setting is any CSI Reporting Setting of the N CSI Reporting Settings, and the given CSI Reporting Setting comprises at least one of Reporting Setting index, CSI, a Cell Identity, reporting Time Domain behavior, CSI Type, codebook configuration and reporting Frequency Domain granularity, reporting period or time-domain offset.

In one subembodiment of the above embodiment, if the reporting Time Domain behavior of the given CSI Reporting Setting is periodic reporting or semi-persistent report, the given CSI Reporting Setting comprises the reporting period and the time-domain offset.

In one subembodiment of the above embodiment, if the reporting Time Domain behavior of the given CSI Reporting Setting is aperiodic, the given CSI Reporting Setting only comprises the time-domain offset between the reporting period and the time-domain offset.

In one embodiment, for the detailed definition of the CSI Reporting Setting, refer to 3GPP TS38.214, section 5.

In one embodiment, the CSI comprises at least one of Rank indication (RI), a Precoding matrix indicator (PMI), a Channel quality indicator (CQI), a Csi-reference signal Resource Indicator (CRI), a Strongest Layer Indicator (SLI), a Reference Signal Received Power (RSRP) or a Synchronization Signal Block Resource Indicator (SSBRI).

In one embodiment, the reporting Time Domain behavior comprises Periodic reporting, Semi-persistent reporting and Aperiodic reporting.

In one embodiment, the CSI Type is a Codebook type corresponding to PMI.

In one embodiment, the CSI Type comprises Type I and Type II, for the detailed definition of the CSI Type, refer to 3GPP TS38.214, section 5.

In one embodiment, the codebook configuration comprises Codebook Subset Restriction.

In one embodiment, the reporting Frequency Domain granularity comprises subband, partial band and wideband.

In one embodiment, the reporting Frequency Domain granularity comprises subband and wideband.

In one embodiment, the reporting Frequency Domain granularity comprises partial band and wideband.

In one embodiment, the reporting Frequency Domain granularity applies to PMI.

In one embodiment, the reporting Frequency Domain granularity applies to CQI.

In one embodiment, the reporting Frequency Domain granularity applies to PMI and CQI.

In one embodiment, the time-domain offset is measured by time-domain resource unit.

In one embodiment, the time-domain offset is measured by ms.

In one embodiment, the period is measured by time-domain resource unit.

In one embodiment, the period is measured by ms.

In one embodiment, the time-domain resource unit refers to slot.

In one embodiment, the time-domain resource unit refers to subframe.

In one embodiment, the time-domain resource unit refers to mini-slot.

In one embodiment, the time-domain resource unit is composed of a positive integer number of consecutive multicarrier symbols.

In one embodiment, the time-domain resource unit refers to 14 consecutive multicarrier symbols.

In one embodiment, the multicarrier symbol is an Orthogonal Frequency-Division Multiplexing (OFDM) symbol.

In one embodiment, the multicarrier symbol is a Single-Carrier Frequency-Division Multiple Access (SC-FDMA) symbol.

In one embodiment, the multicarrier symbol is a Filter Bank Multi Carrier (FBMC) symbol.

In one embodiment, the phrase that a given CSI Reporting Setting is associated with a given radio resource means that the given radio resource is reserved for a reporting of CSI corresponding to the given CSI Reporting Setting.

In one subembodiment, the given CSI is any CSI Reporting Setting of the N CSI Reporting Settings.

In one subembodiment, the given radio resource is any radio resource of the N radio resources.

In one embodiment, the phrase that a given CSI Reporting Setting is associated with a given radio resource means that the given CSI Reporting Setting also comprises configuration information of the given radio resource.

In one subembodiment, the given CSI is any CSI Reporting Setting of the N CSI Reporting Settings.

In one subembodiment, the given radio resource is any radio resource of the N radio resources.

In one embodiment, the phrase that a given CSI Reporting Setting is associated with a given radio resource means that the given CSI Reporting Setting also comprises partial configuration information of the given radio resource.

In one subembodiment, the given CSI is any CSI Reporting Setting of the N CSI Reporting Settings.

In one subembodiment, the given radio resource is any radio resource of the N radio resources.

In one embodiment, the phrase that a given CSI Reporting Setting is associated with a given radio resource means that the given CSI Reporting Setting also comprises an index of the given radio resource.

In one subembodiment, the given CSI is any CSI Reporting Setting of the N CSI Reporting Settings.

In one subembodiment, the given radio resource is any radio resource of the N radio resources.

In one subembodiment, the index of the given radio resource is an index of the given radio resource in a given radio resource set, the given radio resource set comprising a positive integer number of radio resource(s).

In one embodiment, any two of the N radio resources comprise at least one same multicarrier symbol in time domain.

In one embodiment, the N radio resources belong to a same time-domain resource unit in time domain.

In one embodiment, at least two of the N radio resources belong to a same time-domain resource unit in time domain.

In one embodiment, at least two of the N radio resources belong to different time-domain resource units in time domain.

In one embodiment, the N radio resources belong to Licensed Spectrum in frequency domain.

In one embodiment, the N radio resources belong to Unlicensed Spectrum in frequency domain.

In one embodiment, the N radio resources belong to a same carrier in frequency domain.

In one embodiment, at least two of the N radio resources belong to a same carrier in frequency domain.

In one embodiment, at least two of the N radio resources belong to different carriers in frequency domain.

In one embodiment, the N radio resources belong to a same Bandwidth Part (BWP) in frequency domain.

In one embodiment, at least two of the N radio resources belong to a same BWP in frequency domain.

In one embodiment, at least two of the N radio resources belong to different BWPs in frequency domain.

In one embodiment, the N radio resources are resources allocated to an uplink physical layer control channel (i.e., an uplink channel only capable of carrying a physical layer signaling).

In one subembodiment, the uplink physical layer control channel is a Physical Uplink Control CHannel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a Narrow Band PUCCH (NB-PUCCH).

In one embodiment, any of the N radio resources comprises one or more of a time-domain resource, a frequency-domain resource or a code-domain resource.

In one subembodiment, the time-domain resource is composed of a positive integer number of multicarrier symbol(s).

In one subembodiment, the frequency-domain resource is composed of a positive integer number of subcarrier(s).

In one subembodiment, the frequency-domain resource is composed of a positive integer number of Resource Block(s) (RB).

In one embodiment, the J radio resources belong to a same time-domain resource unit in time domain.

In one embodiment, at least two of the J radio resources belong to a same time-domain resource unit in time domain.

In one embodiment, at least two of the J radio resources belong to different time-domain resource units in time domain.

In one embodiment, the J radio resources belong to Licensed Spectrum in frequency domain.

In one embodiment, the J radio resources belong to Unlicensed Spectrum in frequency domain.

In one embodiment, the J radio resources belong to a same carrier in frequency domain.

In one embodiment, at least two of the J radio resources belong to a same carrier in frequency domain.

In one embodiment, at least two of the J radio resources belong to different carriers in frequency domain.

In one embodiment, the J radio resources belong to a same BWP in frequency domain.

In one embodiment, at least two of the J radio resources belong to a same BWP in frequency domain.

In one embodiment, at least two of the J radio resources belong to different BWPs in frequency domain.

In one embodiment, the J radio resources are resources allocated to an uplink physical layer control channel.

In one subembodiment, the uplink physical layer control channel is a PUCCH.

In one subembodiment, the uplink physical layer control channel is an sPUCCH.

In one subembodiment, the uplink physical layer control channel is an NR-PUCCH.

In one subembodiment, the uplink physical layer control channel is an NB-PUCCH.

In one embodiment, any of the J radio resources comprises one or more of a time-domain resource, a frequency-domain resource or a code-domain resource.

In one subembodiment, the time-domain resource is composed of a positive integer number of multicarrier symbol(s).

In one subembodiment, the frequency-domain resource is composed of a positive integer number of subcarrier(s).

In one subembodiment, the frequency-domain resource is composed of a positive integer number of Resource Block(s) (RB).

In one embodiment, the second information explicitly indicates J radio resources.

In one embodiment, the second information implicitly indicates J radio resources.

In one embodiment, the second information is semi-statically configured.

In one embodiment, the second information is carried by a higher-layer signaling.

In one embodiment, the second information is carried by an RRC signaling.

In one embodiment, the second information comprises one or more IEs in an RRC signaling.

In one embodiment, the second information comprises all or part of an IE in an RRC signaling.

In one embodiment, the second information comprises multiple IEs in an RRC signaling.

In one embodiment, the first information and the second information belong to a same IE in an RRC signaling.

In one embodiment, the first information and the second information respectively belong to different IEs in an RRC signaling.

In one embodiment, the second information comprises configuration information of the J radio resources.

In one subembodiment, the configuration information of any radio resource of the J radio resources comprises at least one of occupied time-domain resource, occupied code-domain resource, occupied frequency-domain resource or a corresponding antenna port group.

In one subembodiment, the configuration information of any radio resource of the J radio resources comprises occupied time-domain resource, occupied code-domain resource, occupied frequency-domain resource and a corresponding antenna port group.

In one subembodiment, the configuration information of any radio resource of the J radio resources comprises a starting multicarrier symbol occupied, a number of multicarrier symbols occupied, a starting Physical Resource Block (PRB) previous to or without frequency hopping, a starting PRB after frequency hopping, a number of PRBs occupied, frequency hopping settings, a Cyclic Shift (CS), an Orthogonal Cover Code (OCC), an OCC length, a corresponding antenna port group and a maximum Code Rate.

In one subembodiment, the configuration information of any radio resource of the J radio resources comprises at least one of a starting multicarrier symbol occupied, a number of multicarrier symbols occupied, a starting Physical Resource Block (PRB) previous to or without frequency hopping, a starting PRB after frequency hopping, a number of PRBs occupied, frequency hopping settings, a Cyclic Shift (CS), an Orthogonal Cover Code (OCC), an OCC length, a corresponding antenna port group or a maximum Code Rate.

In one embodiment, the J is a positive integer greater than 1.

In one embodiment, the J is equal to 2.

In one embodiment, the J is equal to 1.

In one embodiment, the M is equal to the N.

In one embodiment, the M is less than the N.

In one embodiment, the phrase that a given radio resource corresponds to a given antenna port group means that a transmission antenna port group for a radio signal transmitted in the given radio resource is spatially associated with the given antenna port group.

In one embodiment, any of the M piece(s) of CSI comprises at least one of Rank indication (RI), a Precoding matrix indicator (PMI), a Channel quality indicator (CQI), a Csi-reference signal Resource Indicator (CRI), a Strongest Layer Indicator (SLI), a Reference Signal Received Power (RSRP) or a Synchronization Signal Block Resource Indicator (SSBRI).

In one embodiment, parameter groups respectively comprised by the M pieces of CSI are the same.

In one subembodiment, the parameter group comprises at least one of RI, a CQI, a CRI, a SLI, a RSRP, or a SSBRI.

In one embodiment, parameter groups respectively comprised by at least two of the M pieces of CSI are the same.

In one subembodiment, the parameter group comprises at least one of RI, a CQI, a CRI, a SLI, a RSRP, or a SSBRI.

In one embodiment, parameter groups respectively comprised by at least two of the M pieces of CSI are different.

In one subembodiment, the parameter group comprises at least one of RI, a CQI, a CRI, a SLI, a RSRP, or a SSBRI.

Embodiment 2

Figure 2:
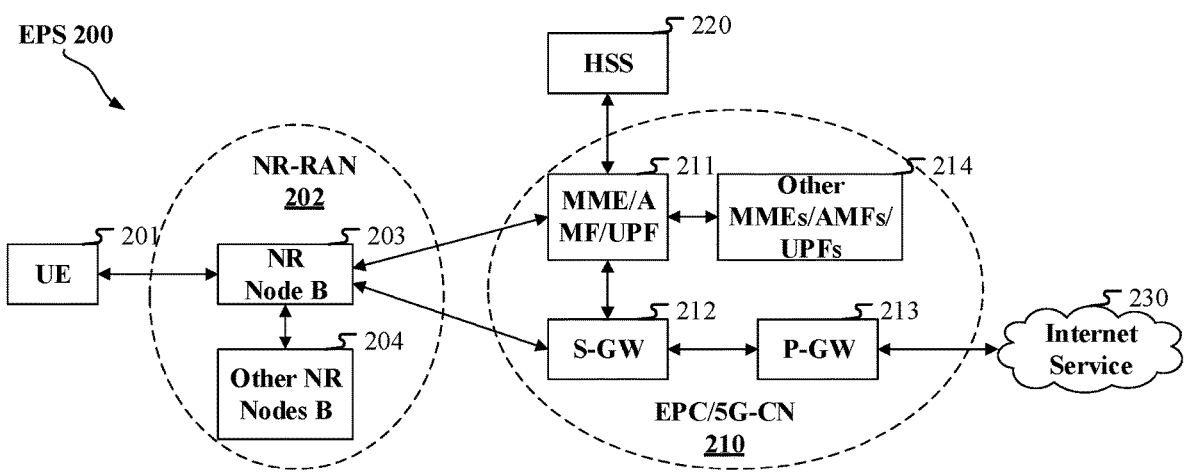
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200 or other appropriate terminology, which may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Non-Terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the UE in the present disclosure.

In one embodiment, the gNB 203 corresponds to the base station in the present disclosure.

In one embodiment, the UE 201 supports wireless communications with data transmitted on Unlicensed Spectrum.

In one embodiment, the UE 201 supports wireless communications with data transmitted on Licensed Spectrum.

In one embodiment, the gNB 203 supports wireless communications with data transmitted on Unlicensed Spectrum.

In one embodiment, the gNB 203 supports wireless communications with data transmitted on Licensed Spectrum.

In one embodiment, the UE 201 supports wireless communications with massive MIMO.

In one embodiment, the gNB 203 supports wireless communications with massive MIMO.

Embodiment 3

Figure 3:
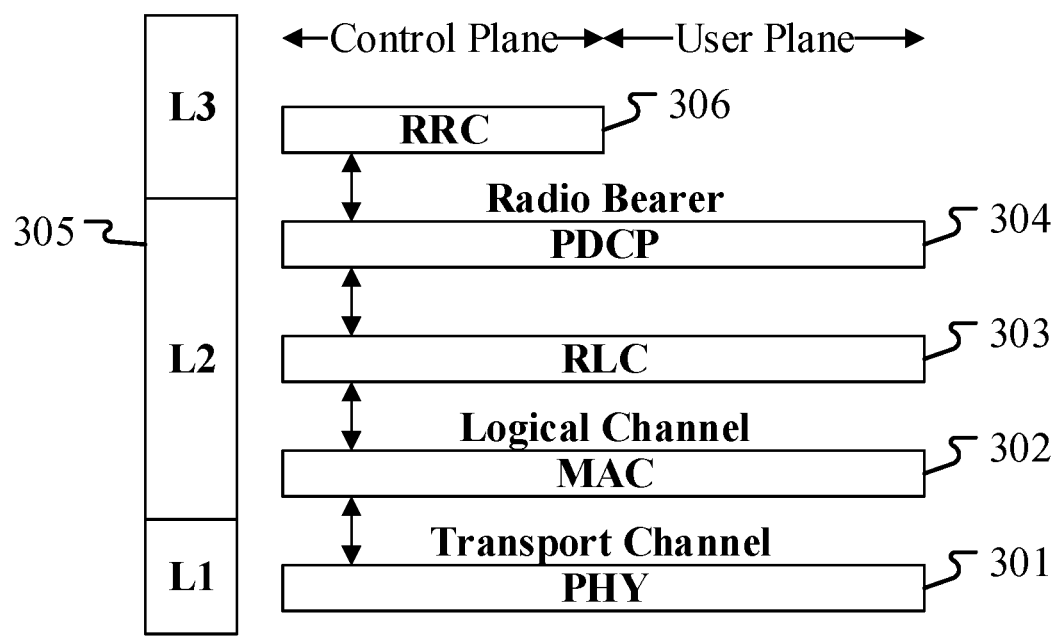
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE of the present disclosure.

In one embodiment, the radio protocol architecture in FIG. 3 is applicable to the base station of the present disclosure.

In one embodiment, the first information in the present disclosure is generated by the RRC sublayer 306.

In one embodiment, the second information in the present disclosure is generated by the RRC sublayer 306.

In one embodiment, the M piece(s) of CSI in the present disclosure is(are) generated by the PHY 301.

In one embodiment, the K piece(s) of CSI in the present disclosure is(are) generated by the PHY 301.

In one embodiment, the access detection in the present disclosure is generated by the PHY 301.

In one embodiment, the third information in the present disclosure is generated by the RRC sublayer 306.

Embodiment 4

Figure 4:
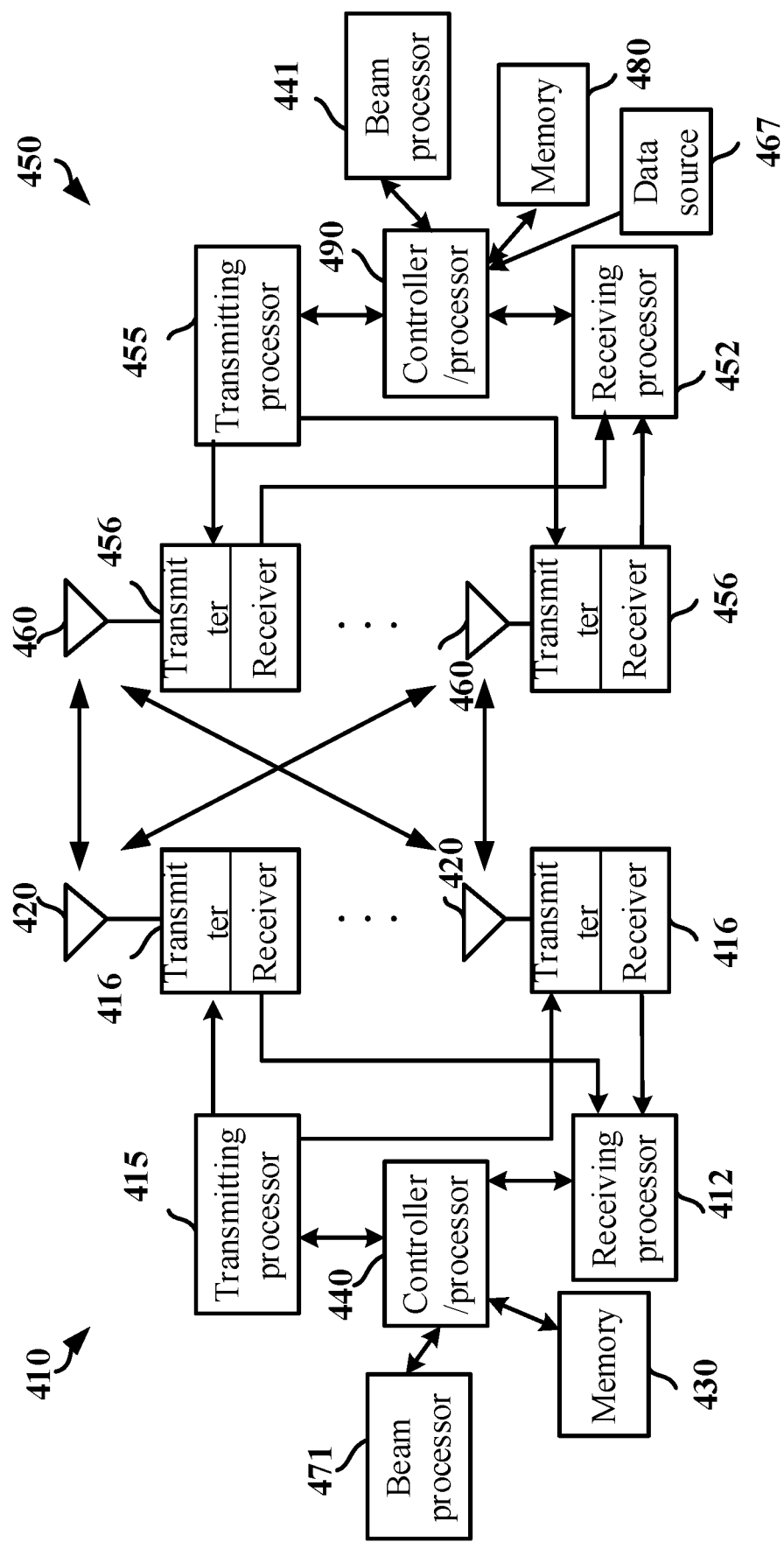
FIG. 4 illustrates a schematic diagram of a New Radio (NR) node and a UE according to one embodiment of the present disclosure.

Embodiment 4 illustrates a schematic diagram of a base station (NR node) and a UE according to the present disclosure, as shown in FIG. 4. FIG. 4 is a block diagram of a gNB 410 in communication with a UE 450 in an access network.

A base station (410) comprises a controller/processor 440, a memory 430, a receiving processor 412, a beam processor 471, a transmitting processor 415, a transmitter/receiver 416 and an antenna 420.

A UE (450) comprises a controller/processor 490, a memory 480, a data source 467, a beam processor 441, a transmitting processor 455, a receiving processor 452, a transmitter/receiver 456 and antenna 460.

In downlink (DL) transmission, processes relevant to the base station 410 comprise the following:

A higher-layer packet is provided to the controller/processor 440, and the controller/processor 440 provides header compression, encryption, packet segmentation and reordering as well as multiplexing and demultiplexing between a logical channel and a transport channel so as to implement the L2 layer protocols used for the user plane and the control plane; the higher-layer packet may comprise data or control information, such as a Downlink Shared Channel (DL-SCH).

The controller/processor 440 is associated with the memory 430 that stores program code and data; the memory 430 can be a computer readable medium.

The controller/processor 440 comprises a scheduling unit for transmission requests, where the scheduling unit is used to schedule radio resources corresponding to transmission requests.

The beam processor 471 determines the first information and the second information.

The transmitting processor 415 receives bit flows output from the controller/processor 440 and provides various signal transmitting processing functions used for the L1 layer (that is PHY), including coding, interleaving, scrambling, modulating, power control/allocation and generation of physical layer control signaling (such as PBCH, PDCCH, PHICH, PCFICH and a reference signal).

The transmitting processor 415 receives bit flows output from the controller/processor 440 and provides various signal transmitting processing functions used for the L1 layer (that is PHY), including multi-antenna transmission, spreading, code division multiplexing and precoding.

The transmitter 416 is configured to convert a baseband signal provided from the transmitting processor 415 into a radio frequency signal which is to be transmitted via the antenna 420; each transmitter 416 performs sampling processing on respectively input symbol stream to acquire respective sampled signal stream. And each transmitter 416 further processes respectively sampled stream, for instance, by digital-to-analogue conversion, amplification, filtering and upconversion, to obtain a downlink signal.

In DL transmission, processes relevant to the UE 450 may comprise the following:

The receiver 456 is used to convert a radio frequency signal received via the antenna 460 into a baseband signal to be provided to the receiving processor 452;

The receiving processor 452 provides various signal receiving processing functions used for the L1 layer (that is PHY), including decoding, de-interleaving, descrambling, demodulating and extraction of physical layer control signaling.

The receiving processor 452 provides various signal receiving processing functions used for the L1 layer (that is PHY), including multi-antenna reception, despreading, code division multiplexing and precoding.

The beam processor 441 determines the first information and the second information.

The controller/processor 490 receives bit flows output from the receiving processor 452, and provides header decompression, decryption, packet segmentation and reordering as well as multiplexing and demultiplexing between a logical channel and a transport channel so as to implement the L2 layer protocols used for the user plane and the control plane.

The controller/processor 490 is associated with the memory 480 that stores program code and data; the memory 480 may be called a computer readable medium.

In uplink (UL) transmission, processes relevant to the base station 410 comprise the following:

The receiver 416 receives a radio frequency signal via a corresponding antenna 420, converting the radio frequency signal into a baseband signal and providing the baseband signal to the receiving processor 412.

The receiving processor 412 provides various signal receiving processing functions used for the L1 layer (that is PHY), including decoding, de-interleaving, descrambling, demodulation and extraction of physical layer control signaling.

The receiving processor 412 provides various signal receiving processing functions used for the L1 layer (that is PHY), including multi-antenna reception, despreading, code division multiplexing and precoding.

The controller/processor 440 implements the functions of the L2 layer, and is associated with the memory 430 that stores program code and data.

The controller/processor 440 provides demultiplexing between a transport channel and a logical channel, packet reassembling, decryption, header decompression and control signal processing so as to recover a higher-layer packet from the UE 450; the higher-layer packet may be provided to a core network.

The beam processor 471 determines M piece(s) of CSI transmitted in a first radio resource.

In UL, processes relevant to the UE 450 comprise the following:

The data source 467 provides a higher-layer packet to the controller/processor 490. The data source 467 represents all protocol layers above the L2 layer.

The transmitter 456 transmits a radio frequency signal via a corresponding antenna 460, converting a baseband signal into a radio frequency signal and providing the radio frequency signal to the corresponding antenna 460.

The transmitting processor 455 provides various signal transmitting processing functions used for the L1 layer (i.e., PHY), including coding, interleaving, scrambling, modulation and generation of physical layer control signaling.

The transmitting processor 455 provides various signal transmitting processing functions used for the L1 layer (i.e., PHY), including multi-antenna transmission, spreading, code division multiplexing and precoding.

The controller/processor 490 performs header compression, encryption, packet segmentation and reordering as well as multiplexing between a logical channel and a transport channel based on radio resources allocation of the gNB 410, thereby implementing the L2 layer functions used for the user plane and the control plane.

The controller/processor 490 is also in charge of HARQ operation, retransmission of a lost packet and a signaling to the gNB 410.

The beam processor 441 determines M piece(s) of CSI transmitted in a first radio resource.

In one embodiment, the UE 450 comprises at least one processor and at least one memory. The at least one memory includes computer program codes. The at least one memory and the computer program codes are configured to be used in collaboration with the at least one processor. The UE 450 at least receives first information, the first information being used to indicate N Channel Status Information (CSI) Reporting Settings, the N CSI Reporting Settings respectively being associated with N radio resources, and N being a positive integer greater than 1; and receives second information, the second information being used to indicate J radio resource(s), and J being a positive integer; and transmits M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N; herein, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

In one embodiment, the UE 450 comprises a memory that stores a computer readable instruction program. The computer readable instruction program generates actions when executed by at least one processor, which include: receiving first information, the first information being used to indicate N Channel Status Information (CSI) Reporting Settings, the N CSI Reporting Settings respectively being associated with N radio resources, and N being a positive integer greater than 1; and receiving second information, the second information being used to indicate J radio resource(s), and J being a positive integer; and transmitting M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N; herein, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

In one embodiment, the gNB 410 comprises at least one processor and at least one memory. The at least one memory includes computer program codes. The at least one memory and the computer program codes are configured to be used in collaboration with the at least one processor. The gNB 410 at least transmits first information, the first information being used to indicate N Channel Status Information (CSI) Reporting Settings, the N CSI Reporting Settings respectively being associated with N radio resources, and N being a positive integer greater than 1; transmits second information, the second information being used to indicate J radio resource(s), and J being a positive integer; and receives M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N; herein, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

In one embodiment, the gNB 410 comprises a memory that stores a computer readable instruction program. The computer readable instruction program generates actions when executed by at least one processor, which include: transmitting first information, the first information being used to indicate N Channel Status Information (CSI) Reporting Settings, the N CSI Reporting Settings respectively being associated with N radio resources, and N being a positive integer greater than 1; transmitting second information, the second information being used to indicate J radio resource(s), and J being a positive integer; and receiving M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N; herein, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

In one embodiment, the UE 450 corresponds to a UE in the present disclosure.

In one embodiment, the gNB 410 corresponds to a base station in the present disclosure.

In one embodiment, at least the first two of the receiver 456, the receiving processor 452 and the controller/processor 490 are used to receive the first information in the present disclosure.

In one embodiment, at least the first two of the transmitter 416, the transmitting processor 415 and the controller/processor 440 are used to transmit the first information in the present disclosure.

In one embodiment, at least the first two of the receiver 456, the receiving processor 452 and the controller/processor 490 are used to receive the second information in the present disclosure.

In one embodiment, at least the first two of the transmitter 416, the transmitting processor 415 and the controller/processor 440 are used to transmit the second information in the present disclosure.

In one embodiment, at least the first two of the receiver 456, the receiving processor 452 and the controller/processor 490 are used to receive the third information in the present disclosure.

In one embodiment, at least the first two of the transmitter 416, the transmitting processor 415 and the controller/processor 440 are used to transmit the third information in the present disclosure.

In one embodiment, at least the first two of the transmitter 456, the transmitting processor 455 and the controller/processor 490 are used to transmit the M piece(s) of CSI of the present disclosure in the first radio resource of the present disclosure.

In one embodiment, at least the first two of the receiver 416, the receiving processor 412 and the controller/processor 440 are used to receive the M piece(s) of CSI of the present disclosure in the first radio resource of the present disclosure.

In one embodiment, at least the first two of the transmitter 456, the transmitting processor 455 and the controller/processor 490 are used to transmit the K piece(s) of CSI of the present disclosure in the second radio resource of the present disclosure.

In one embodiment, at least the first two of the receiver 416, the receiving processor 412 and the controller/processor 440 are used to receive the K piece(s) of CSI of the present disclosure in the second radio resource of the present disclosure.

In one embodiment, at least the first two of the receiver 456, the receiving processor 452 and the controller/processor 490 are used to perform the access detection in the present disclosure to determine the first radio resource in the present disclosure out of the J radio resources in the present disclosure.

In one embodiment, at least the first two of the receiver 416, the receiving processor 412 and the controller/processor 440 are used to monitor the J radio resources in the present disclosure to determine the first radio resource in the present disclosure.

Embodiment 5

Figure 5:
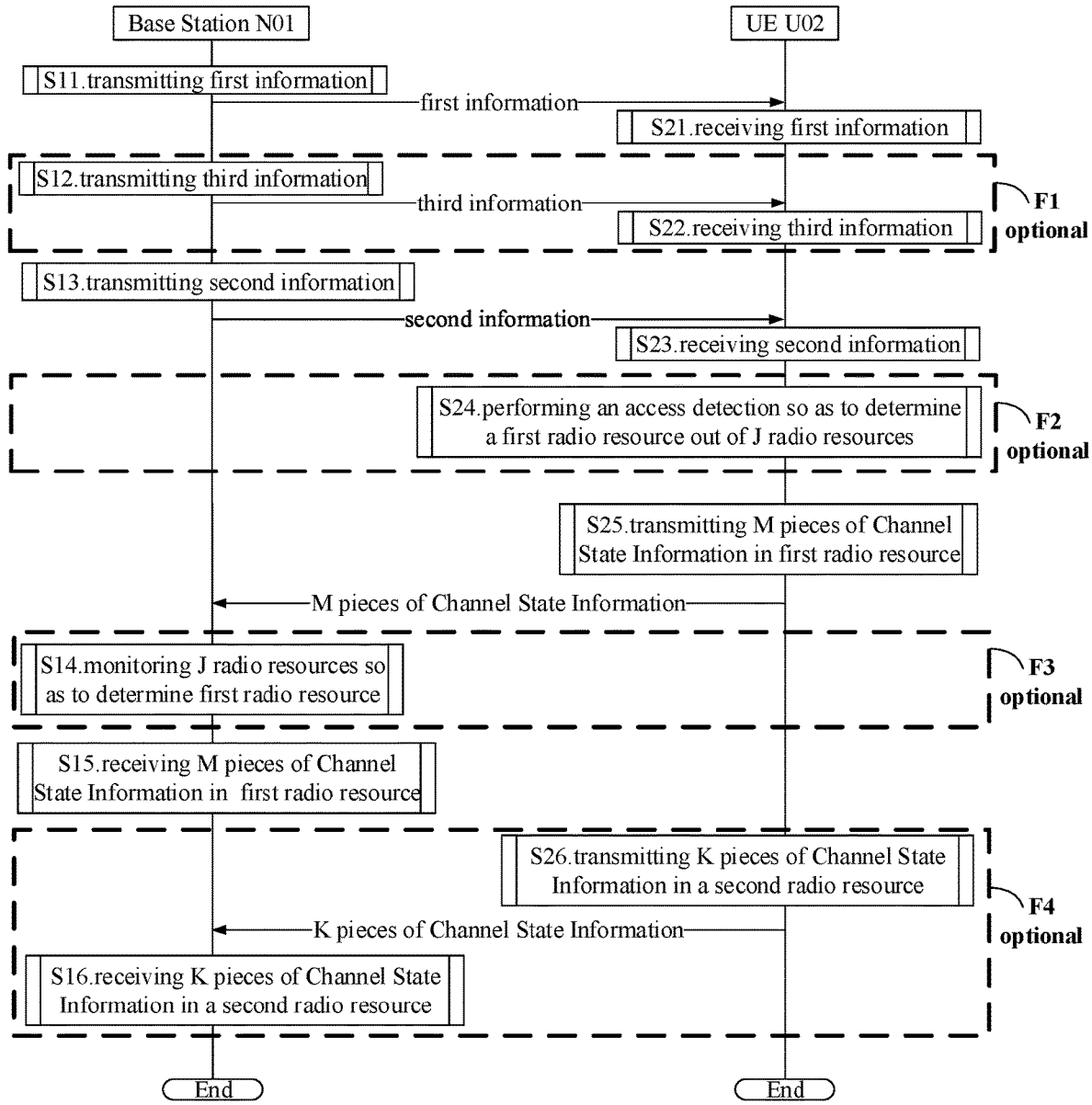
FIG. 5 illustrates a flowchart of wireless transmissions according to one embodiment of the present disclosure.
Figure 6A:
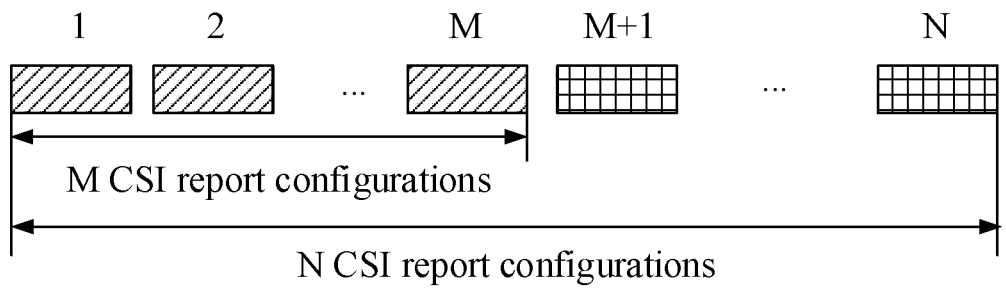
FIG. 6A-FIG. 6B respectively illustrate a schematic diagram of whether N antenna port groups are spatially associated with a first antenna port group being used to determine M CSI Reporting Setting(s) out of N CSI Reporting Settings according to one embodiment of the present disclosure.
Figure 6B:
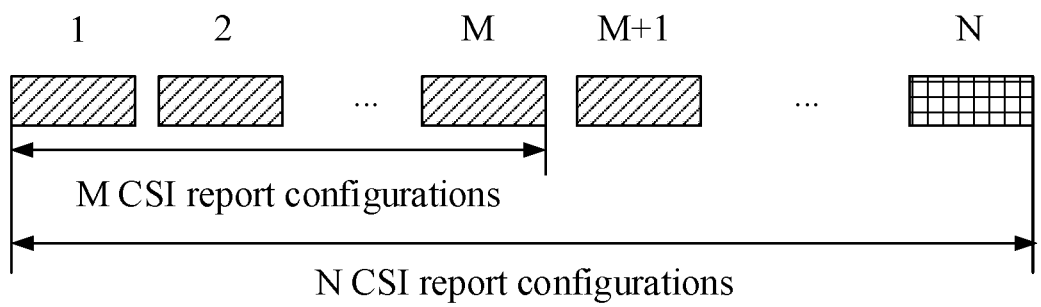

Embodiment 5 illustrates a flowchart of wireless transmissions, as shown in FIG. 5. In FIG. 5, a base station N01 is a maintenance base station for a serving cell of a UE U02. In FIG. 5, boxes F1, F2, F3 and F4 are optional.

The N01 transmits first information in step S11; transmits third information in step S12; and transmits second information in step S13; monitors J radio resources in step S14 to determine a first radio resource; receives M piece(s) of CSI in a first radio resource in step S15; and receives K piece(s) of CSI in a second radio resource in step S16.

The U02 receives first information in step S21; receives third information in step S22; and receives second information in step S23; performs an access detection in step S24 to determine a first radio resource out of J radio resources; transmits M piece(s) of CSI in a first radio resource in step S25; and transmits K piece(s) of CSI in a second radio resource in step S26.

In Embodiment 5, the first information is used to indicate N Channel Status Information (CSI) Reporting Settings, the N CSI Reporting Settings respectively being associated with N radio resources, and N being a positive integer greater than 1; the second information is used to indicate J radio resources, J being a positive integer; the M piece(s) of CSI respectively corresponds(correspond) to M CSI Reporting Setting(s) among the N CSI Reporting Settings, the first radio resource is one of the J radio resources, and M is a positive integer no greater than the N; herein, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings. The K piece(s) of CSI respectively corresponds(correspond) to K CSI Reporting Setting(s) among the N CSI Reporting Settings other than the M CSI Reporting Setting(s), K being a positive integer no greater than N−M; herein, the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group. The third information is used to indicate configuration information of the N radio resources.

In one embodiment, the second antenna port group is not spatially associated with the first antenna port group.

In one embodiment, the K is equal to N−M.

In one embodiment, the K is less than N−M.

In one embodiment, a code rate for carrying the K piece(s) of CSI in the second radio resource is no greater than a maximum code rate for the second radio resource.

In one embodiment, N2 CSI Reporting Setting(s) is(are) composed of CSI Reporting Setting(s) among the N CSI Reporting Settings, of which each CSI Reporting Setting corresponds to one of the N antenna port groups spatially associated with the second antenna port group, N2 being a positive integer no greater than N−M.

In one subembodiment, the N2 CSI Reporting Setting(s) comprises(comprise) the K CSI Reporting Setting(s).

In one subembodiment, the N2 piece(s) of CSI comprises (comprise) the K piece(s) of CSI.

In one subembodiment, the N2 is equal to the K.

In one subembodiment, the N2 is greater than the K.

In one subembodiment, the N2 is equal to the K, the K CSI Reporting Setting(s) comprises(comprise) CSI Reporting Setting(s) among the N CSI Reporting Settings, of which each CSI Reporting Setting corresponds to one of the N antenna port groups spatially associated with the second antenna port group.

In one subembodiment, the N2 is greater than the K, the K CSI Reporting Setting(s) is(are) CSI Reporting Setting(s) that corresponds(correspond) to CSI(s) with K highest transmission priority class(es) among CSIs respectively corresponding to the N2 CSI Reporting Settings.

In one subembodiment, the N2 is greater than the K, if a code rate for carrying the K piece(s) of CSI and third reference CSI in the second radio resource is greater than a maximum code rate for the second radio resource, the third reference CSI corresponds to any of the N2 CSI Reporting Settings other than the K CSI Reporting Setting(s).

In one embodiment, transmission priority classes of the N2 pieces of CSI are related to reporting setting indexes, parameter groups comprised by CSI, cell indexes and reporting Time Domain behaviors respectively corresponding to the N2 CSI Reporting Settings.

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of the N2 pieces of CSI are related to at least one of reporting setting indexes, parameter groups comprised by CSI, cell indexes or reporting Time Domain behaviors respectively corresponding to the N2 CSI Reporting Settings.

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of the K pieces of CSI are related to reporting setting indexes, parameter groups comprised by CSI, cell indexes and reporting Time Domain behaviors respectively corresponding to the K CSI Reporting Settings.

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of the K pieces of CSI are related to at least one of reporting setting indexes, parameter groups comprised by CSI, cell indexes or reporting Time Domain behaviors respectively corresponding to the K CSI Reporting Settings.

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, the access detection comprises J1 sub-access detection(s), any sub-access detection of the J1 sub-access detection(s) is used to determine whether to transmit part of or all CSI corresponding to the N CSI Reporting Settings in at least one radio resource among the J radio resources, and whether to transmit part of or all CSI corresponding to the N CSI Reporting Settings in any of the J radio resources is determined by one of the J1 sub-access detection(s), J1 being a positive integer no greater than the J.

In one subembodiment, the J1 is equal to the J.

In one subembodiment, the J1 is less than the J.

In one subembodiment, any of the J1 sub-access detections comprises a positive integer number of energy detection(s), and any antenna port in the first antenna port group is spatially correlated to any energy detection comprised in a first sub-access detection, the first sub-access detection being one of the J1 sub-access detections; at least one antenna port in the first antenna port group is not spatially correlated to any energy detection comprised in any of the J1 sub-access detections other than the first sub-access detection; a result of the first sub-access detection is to transmit part of or all CSI corresponding to the N CSI Reporting Settings in the first radio resource; a result of any of the J1 sub-access detections other than the first sub-access detection is to drop transmitting part of or all CSI corresponding to the N CSI Reporting Settings in at least one radio resource among the J radio resources.

In one subembodiment, any of the J1 sub-access detections comprises a positive integer number of energy detection(s), and any antenna port in the first antenna port group is spatially correlated to any energy detection comprised in a first sub-access detection, the first sub-access detection being one of the J1 sub-access detections; at least one antenna port in the first antenna port group is not spatially correlated to any energy detection comprised in any of the J1 sub-access detections other than the first sub-access detection; a result of the first sub-access detection is to transmit part of or all CSI corresponding to the N CSI Reporting Settings in the first radio resource.

In one subembodiment, any of the J1 sub-access detections comprises a positive integer number of energy detection(s), and any antenna port in the second antenna port group is spatially correlated to any energy detection comprised in a second sub-access detection, the second sub-access detection being one of the J1 sub-access detections; at least one antenna port in the second antenna port group is not spatially correlated to any energy detection comprised in any of the J1 sub-access detections other than the second sub-access detection; a result of the second sub-access detection is to transmit part of or all CSI corresponding to the N CSI Reporting Settings in the second radio resource.

In one embodiment, the access detection comprises J sub-access detections, and the J sub-access detections are respectively used to determine whether to transmit part of or all CSI corresponding to the N CSI Reporting Settings in the J radio resources.

In one subembodiment, any of the J sub-access detections comprises a positive integer number of energy detection(s), and any antenna port in the first antenna port group is spatially correlated to any energy detection comprised in a third sub-access detection, the third sub-access detection being one of the J sub-access detections; at least one antenna port in the first antenna port group is not spatially correlated to any energy detection comprised in any of the J sub-access detections other than the third sub-access detection; a result of the third sub-access detection is to transmit part of or all CSI corresponding to the N CSI Reporting Settings in the first radio resource; a result of any of the J sub-access detections other than the third sub-access detection is to drop transmitting part of or all CSI corresponding to the N CSI Reporting Settings in one of the J radio resources.

In one subembodiment, any of the J sub-access detections comprises a positive integer number of energy detection(s), and any antenna port in the first antenna port group is spatially correlated to any energy detection comprised in a third sub-access detection, the third sub-access detection being one of the J sub-access detections; at least one antenna port in the first antenna port group is not spatially correlated to any energy detection comprised in any of the J sub-access detections other than the third sub-access detection; a result of the third sub-access detection is to transmit part of or all CSI corresponding to the N CSI Reporting Settings in the first radio resource.

In one subembodiment, any of the J sub-access detections comprises a positive integer number of energy detection(s), and any antenna port in the second antenna port group is spatially correlated to any energy detection comprised in a fourth sub-access detection, the fourth sub-access detection being one of the J sub-access detections; at least one antenna port in the second antenna port group is not spatially correlated to any energy detection comprised in any of the J sub-access detections other than the fourth sub-access detection; a result of the fourth sub-access detection is to transmit part of or all CSI corresponding to the N CSI Reporting Settings in the second radio resource.

In one embodiment, monitoring the J radio resources to determine the first radio resource refers to monitoring respectively in the J radio resources whether a radio signal used to transmit at least one of N pieces of CSI respectively corresponding to the N CSI Reporting Settings is to be transmitted, the first radio resource is one and only radio resource among the J radio resources in which a radio signal used to transmit at least one of N pieces of CSI respectively corresponding to the N CSI Reporting Settings is transmitted.

In one embodiment, monitoring the J radio resources is used to determine the first radio resource and the second radio resource.

In one embodiment, monitoring the J radio resources to determine the first radio resource and the second radio resource refers to monitoring respectively in the J radio resources whether a radio signal used to transmit at least one of N pieces of CSI respectively corresponding to the N CSI Reporting Settings is to be transmitted, each of the second radio resource and the first radio resource is a radio resource in which a radio signal used to transmit at least one of N pieces of CSI respectively corresponding to the N CSI Reporting Settings is transmitted.

In one embodiment, monitoring the J radio resources to determine the first radio resource refers to monitoring respectively in the J radio resources whether a radio signal used to transmit at least one of N pieces of CSI respectively corresponding to the N CSI Reporting Settings is to be transmitted, the first radio resource is one of the J radio resources in which a radio signal used to transmit at least one of N pieces of CSI respectively corresponding to the N CSI Reporting Settings is transmitted.

In one embodiment, monitoring whether a given radio signal is to be transmitted in a given radio resource refers to determining whether a given radio signal is to be transmitted in the given radio resource according to energy of a received signal in a given radio resource.

In one subembodiment, the given radio resource is any radio resource of the J radio resources, and the given radio signal is a radio signal used to transmit at least one of N pieces of CSI respectively corresponding to the N CSI Reporting Settings.

In one subembodiment, if the energy of the received signal in the given radio resource is lower, it is deemed that the given radio signal is not transmitted in the given radio resource, otherwise, it is deemed that the given radio signal is transmitted in the given radio resource.

In one subembodiment, if the energy of the received signal in the given radio resource is lower than a reference energy threshold, it is deemed that the given radio signal is not transmitted in the given radio resource, otherwise, it is deemed that the given radio signal is transmitted in the given radio resource; the reference energy threshold is configured by the base station itself.

In one embodiment, monitoring whether a given radio signal is to be transmitted in a given radio resource refers to determining whether a given radio signal is to be transmitted in the given radio resource according to power of a received signal in a given radio resource.

In one subembodiment, the given radio resource is any radio resource of the J radio resources, and the given radio signal is a radio signal used to transmit at least one of N pieces of CSI respectively corresponding to the N CSI Reporting Settings.

In one subembodiment, if the power of the received signal in the given radio resource is lower, it is deemed that the given radio signal is not transmitted in the given radio resource, otherwise, it is deemed that the given radio signal is transmitted in the given radio resource.

In one subembodiment, if the power of the received signal in the given radio resource is lower than a reference power threshold, it is deemed that the given radio signal is not transmitted in the given radio resource, otherwise, it is deemed that the given radio signal is transmitted in the given radio resource; the reference power threshold is configured by the base station itself.

In one embodiment, monitoring whether a given radio signal is to be transmitted in a given radio resource refers to determining whether a given radio signal is to be transmitted in the given radio resource according to correlation between a received signal in a given radio resource and a given radio signal.

In one subembodiment, the given radio resource is any radio resource of the J radio resources, and the given radio signal is a radio signal used to transmit at least one of N pieces of CSI respectively corresponding to the N CSI Reporting Settings.

In one subembodiment, if the correlation between the received signal in the given radio resource and the given radio signal is lower, it is deemed that the given radio signal is not transmitted in the given radio resource, otherwise, it is deemed that the given radio signal is transmitted in the given radio resource.

In one subembodiment, if the correlation between the received signal in the given radio resource and the given radio signal is lower than a reference correlation threshold, it is deemed that the given radio signal is not transmitted in the given radio resource, otherwise, it is deemed that the given radio signal is transmitted in the given radio resource; the reference correlation threshold is configured by the base station itself.

In one embodiment, monitoring whether a given radio signal is to be transmitted in a given radio resource refers to measuring a received signal in a given radio resource according to configuration parameters of a given radio signal to estimate a channel, and determining whether the given radio signal is to be transmitted in the given radio resource according to the estimated channel.

In one subembodiment, the given radio resource is any radio resource of the J radio resources, and the given radio signal is a radio signal used to transmit at least one of N pieces of CSI respectively corresponding to the N CSI Reporting Settings.

In one subembodiment, if the energy of the estimated channel is lower, it is deemed that the given radio signal is not transmitted in the given radio resource, otherwise, it is deemed that the given radio signal is transmitted in the given radio resource.

In one subembodiment, if the energy of the estimated channel is lower than a reference channel energy threshold, it is deemed that the given radio signal is not transmitted in the given radio resource, otherwise, it is deemed that the given radio signal is transmitted in the given radio resource; the reference channel energy threshold is configured by the base station itself.

In one subembodiment, if the power of the estimated channel is lower, it is deemed that the given radio signal is not transmitted in the given radio resource, otherwise, it is deemed that the given radio signal is transmitted in the given radio resource.

In one subembodiment, if the power of the estimated channel is lower than a reference channel power threshold, it is deemed that the given radio signal is not transmitted in the given radio resource, otherwise, it is deemed that the given radio signal is transmitted in the given radio resource; the reference channel power threshold is configured by the base station itself.

In one subembodiment, if properties of the estimated channel are not consistent with desirable ones, it is deemed that the given radio signal is not transmitted in the given radio resource, otherwise, it is deemed that the given radio signal is transmitted in the given radio resource.

In one embodiment, the third information explicitly indicates configuration information of the N radio resources.

In one embodiment, the third information implicitly indicates configuration information of the N radio resources.

In one embodiment, the third information is semi-statically configured.

In one embodiment, the third information is carried by a higher layer signaling.

In one embodiment, the third information is carried by an RRC signaling.

In one embodiment, the third information comprises one or more IEs in an RRC signaling.

In one embodiment, the third information comprises all or part of an IE in an RRC signaling.

In one embodiment, the third information comprises multiple IEs in an RRC signaling.

In one embodiment, the first information, the second information and the third information belong to a same IE in an RRC signaling.

In one embodiment, the first information and the third information belong to a same IE in an RRC signaling.

In one embodiment, the second information and the third information belong to a same IE in an RRC signaling.

In one embodiment, the first information and the third information respectively belong to different IEs in an RRC signaling.

In one embodiment, the second information and the third information respectively belong to different IEs in an RRC signaling.

In one embodiment, configuration information of any of the N radio resources comprises at least one of occupied time-domain resource, occupied code-domain resource, occupied frequency-domain resource or a corresponding antenna port group.

In one embodiment, configuration information of any of the N radio resources comprises occupied time-domain resource, occupied code-domain resource, occupied frequency-domain resource and a corresponding antenna port group.

In one embodiment, configuration information of any of the N radio resources comprises a starting multicarrier symbol occupied, a number of multicarrier symbols occupied, a starting Physical Resource Block (PRB) previous to or without frequency hopping, a starting PRB after frequency hopping, a number of PRBs occupied, frequency hopping settings, a Cyclic Shift (CS), an Orthogonal Cover Code (OCC), an OCC length, a corresponding antenna port group and a maximum Code Rate.

In one embodiment, configuration information of any of the N radio resources comprises at least one of a starting multicarrier symbol occupied, a number of multicarrier symbols occupied, a starting Physical Resource Block (PRB) previous to or without frequency hopping, a starting PRB after frequency hopping, a number of PRBs occupied, frequency hopping settings, a Cyclic Shift (CS), an Orthogonal Cover Code (OCC), an OCC length, a corresponding antenna port group or a maximum Code Rate.

Embodiment 6

Embodiment 6A—Embodiment 6B respectively illustrate a schematic diagram of whether N antenna port groups are spatially associated with a first antenna port group being used to determine M CSI Reporting Setting(s) out of N CSI Reporting Settings.

In Embodiment 6, each of M antenna port group(s) among the N antenna port groups that respectively corresponds (correspond) to the M CSI Reporting Setting(s) is spatially associated with the first antenna port group.

In one embodiment, the M antenna port group(s) is(are) antenna port group(s) among the N antenna port groups respectively corresponding to M radio resource(s) of the N radio resources that is(are) respectively associated with the M CSI Reporting Setting(s).

In one embodiment, a given CSI Reporting Setting is any of the N CSI Reporting Settings, and one of the N antenna port groups that corresponds to the given CSI Reporting Setting is one of the N antenna port groups that corresponds to one of the N radio resources associated with the given CSI Reporting Setting; given CSI is CSI comprised by the given CSI Reporting Setting, and one of the N antenna port groups which corresponds to the given CSI is one of the N antenna port groups that corresponds to the given CSI Reporting Setting.

In one embodiment, a code rate for carrying the M piece(s) of CSI in the first radio resource is no greater than a maximum code rate for the first radio resource.

In one embodiment, N1 CSI Reporting Setting(s) is(are) composed of CSI Reporting Setting(s) among the N CSI Reporting Settings, of which each CSI Reporting Setting corresponds to one of the N antenna port groups spatially associated with the first antenna port group, and the N1 CSI Reporting Setting(s) respectively corresponds(correspond) to N1 piece(s) of CSI, N1 being a positive integer no greater than N.

In one subembodiment, the N1 CSI Reporting Setting(s) comprises(comprise) the M CSI Reporting Setting(s).

In one subembodiment, the N1 piece(s) of CSI comprises (comprise) the M piece(s) of CSI.

In one subembodiment, the N1 is equal to the M.

In one subembodiment, the N1 is greater than the M.

In one subembodiment, the N1 is equal to the M, the M CSI Reporting Setting(s) comprises(comprise) CSI Reporting Setting(s) among the N CSI Reporting Settings, of which each CSI Reporting Setting corresponds to one of the N antenna port groups spatially associated with the first antenna port group.

In one subembodiment, the N1 is greater than the M, the M CSI Reporting Setting(s) is(are) CSI Reporting Setting(s) that corresponds(correspond) to CSI(s) with M highest transmission priority class(es) among CSIs corresponding to the N1 CSI Reporting Settings.

In one subembodiment, the N1 is greater than the M, if a code rate for carrying the M piece(s) of CSI and first reference CSI in the first radio resource is greater than a maximum code rate for the first radio resource, the first reference CSI corresponds to any of the N1 CSI Reporting Settings other than the M CSI Reporting Setting(s).

In one embodiment, transmission priority classes of the N1 pieces of CSI are related to reporting setting indexes, parameter groups comprised by CSI, cell indexes and reporting Time Domain behaviors respectively corresponding to the N1 CSI Reporting Settings.

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of the N1 pieces of CSI are related to at least one of reporting setting indexes, parameter groups comprised by CSI, cell indexes or reporting Time Domain behaviors respectively corresponding to the N1 CSI Reporting Settings.

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of the M pieces of CSI are related to reporting setting indexes, parameter groups comprised by CSI, cell indexes and reporting Time Domain behaviors respectively corresponding to the M CSI Reporting Settings.

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of the M pieces of CSI are related to at least one of reporting setting indexes, parameter groups comprised by CSI, cell indexes or reporting Time Domain behaviors respectively corresponding to the M CSI Reporting Settings.

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, the Embodiment 6A corresponds to a schematic diagram of whether N antenna port groups are spatially associated with a first antenna port group being used to determine M CSI Reporting Setting(s) out of N CSI Reporting Settings, wherein N1 CSI Reporting Setting(s) is(are) composed of CSI Reporting Setting(s) among the N CSI Reporting Settings, of which each CSI Reporting Setting corresponds to one of the N antenna port groups spatially associated with the first antenna port group, N1 being equal to the M.

In one embodiment, the Embodiment 6B corresponds to a schematic diagram of whether N antenna port groups are spatially associated with a first antenna port group being used to determine M CSI Reporting Setting(s) out of N CSI Reporting Settings, wherein N1 CSI Reporting Settings are composed of CSI Reporting Settings among the N CSI Reporting Settings, of which each CSI Reporting Setting corresponds to one of the N antenna port groups spatially associated with the first antenna port group, N1 being greater than the M.

Embodiment 7

Figure 7:
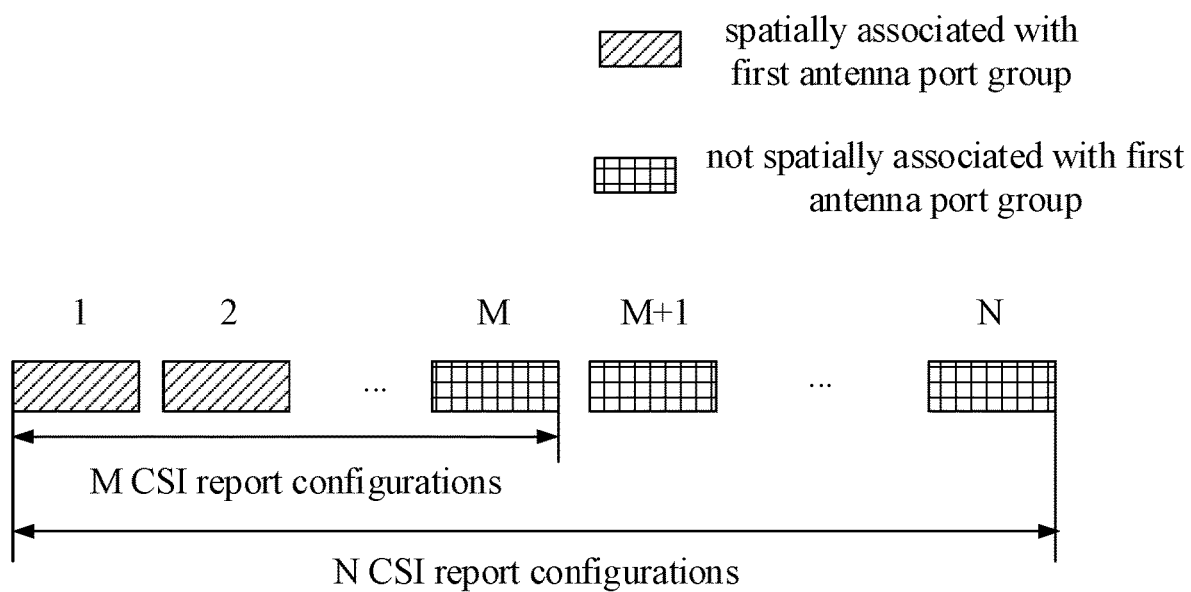
FIG. 7 illustrates a schematic diagram of whether N antenna port groups are spatially associated with a first antenna port group being used to determine M CSI Reporting Setting(s) out of N CSI Reporting Settings according to one embodiment of the present disclosure.

Embodiment 7 illustrates another schematic diagram of whether N antenna port groups are spatially associated with a first antenna port group being used to determine M CSI Reporting Setting(s) out of N CSI Reporting Settings, as shown in FIG. 7.

In Embodiment 7, when at least one antenna port group of M antenna port group(s) among the N antenna port groups that respectively corresponds(correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

In one embodiment, whether the M antenna port group(s) is(are) spatially associated with the first antenna port group is used to determine (a) transmission priority class(es) of the M piece(s) of CSI.

In one embodiment, a sequential order of the M pieces of CSI is consistent with a descending order of transmission priority classes of the M pieces of CSI.

In one embodiment, an order of the M pieces of CSI arranged from lower bit index to higher bit index is consistent with a descending order of transmission priority classes of the M pieces of CSI.

In one embodiment, an order of the M pieces of CSI arranged from higher bit index to lower bit index is consistent with a descending order of transmission priority classes of the M pieces of CSI.

In one embodiment, the first radio resource is used to carry Uplink Control Information (UCI), a sequential order of the M pieces of CSI in the UCI is consistent with a descending order of transmission priority classes of the M pieces of CSI.

In one embodiment, the first radio resource is used to carry Uplink Control Information (UCI), an order of the M pieces of CSI in the UCI arranged from lower bit index to higher bit index is consistent with a descending order of transmission priority classes of the M pieces of CSI.

In one embodiment, the first radio resource is used to carry Uplink Control Information (UCI), an order of the M pieces of CSI in the UCI arranged from higher bit index to lower bit index is consistent with a descending order of transmission priority classes of the M pieces of CSI.

In one embodiment, the first radio resource is used to carry Uplink Control Information (UCI), among the M pieces of CSI, a position of any piece of CSI of higher transmission priority class in the UCI is prior to that of any piece of CSI with lower transmission priority class in the UCI.

In one embodiment, the first radio resource is used to carry Uplink Control Information (UCI), any of the M pieces of CSI of higher transmission priority class is at a lower bit index in the UCI.

In one embodiment, the first radio resource is used to carry Uplink Control Information (UCI), any of the M pieces of CSI of higher transmission priority class is at a higher bit index in the UCI.

In one embodiment, a code rate for carrying the M piece(s) of CSI in the first radio resource is no greater than a maximum code rate for the first radio resource.

In one embodiment, N1 CSI Reporting Setting(s) is(are) composed of CSI Reporting Setting(s) among the N CSI Reporting Settings, of which each CSI Reporting Setting corresponds to one of the N antenna port groups spatially associated with the first antenna port group, the N1 CSI Reporting Setting(s) respectively corresponds(correspond) to N1 piece(s) of CSI, and the N CSI Reporting Settings respectively correspond to N pieces of CSI, the N1 being a positive integer less than the N.

In one subembodiment, the M CSI Reporting Setting(s) comprises(comprise) the N1 CSI Reporting Setting(s).

In one subembodiment, the M piece(s) of CSI comprises (comprise) the N1 piece(s) of CSI.

In one subembodiment, the N pieces of CSI comprise the M piece(s) of CSI.

In one subembodiment, the N pieces of CSI comprise the N1 piece(s) of CSI.

In one subembodiment, the N1 is less than the M.

In one subembodiment, a transmission priority class of any of the N1 piece(s) of CSI is higher than a transmission priority class of any of M−N1 piece(s) of CSI among the M pieces of CSI other than the N1 piece(s) of CSI.

In one subembodiment, the M is equal to the N.

In one subembodiment, the M is less than the N, M−N1 piece(s) of CSI among the M pieces of CSI other than the N1 piece(s) of CSI is(are) M−N1 piece(s) of CSI of the highest transmission priority class out of N–N1 pieces of CSI among the N pieces of CSI other than the N1 piece(s) of CSI.

In one subembodiment, the M is less than the N, when a code rate for carrying the M piece(s) of CSI and second reference CSI in the first radio resource is greater than that for a maximum code rate for the first radio resource, the second reference CSI is one of the N pieces of CSI other than the M piece(s) of CSI.

In one subembodiment, the M is less than the N, when a code rate for carrying the M piece(s) of CSI and second reference CSI in the first radio resource is greater than a maximum code rate for the first radio resource, the second reference CSI is a piece of CSI with the (M−N1+1)-th highest transmission priority class among N−N1 of the N pieces of CSI other than the N1 piece(s) of CSI.

In one embodiment, transmission priority classes of the N1 pieces of CSI are related to reporting setting indexes, parameter groups comprised by CSI, cell indexes and reporting Time Domain behaviors respectively corresponding to the N1 CSI Reporting Settings.

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of the N1 pieces of CSI are related to at least one of reporting setting indexes, parameter groups comprised by CSI, cell indexes or reporting Time Domain behaviors respectively corresponding to the N1 CSI Reporting Settings.

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of N–N1 pieces of CSI among the N pieces of CSI other than the N1 piece(s) of CSI are related to reporting setting indexes, parameter groups comprised by CSI, cell indexes and reporting Time Domain behaviors respectively corresponding to the N–N1 CSI Reporting Settings among the N CSI Reporting Settings other than the N1 CSI Reporting Setting(s).

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of N–N1 pieces of CSI among the N pieces of CSI other than the N1 piece(s) of CSI are related to at least one of reporting setting indexes, parameter groups comprised by CSI, cell indexes or reporting Time Domain behaviors respectively corresponding to the N–N1 CSI Reporting Settings among the N CSI Reporting Settings other than the N1 CSI Reporting Setting(s).

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of M–N1 pieces of CSI among the M pieces of CSI other than the N1 piece(s) of CSI are related to reporting setting indexes, parameter groups comprised by CSI, cell indexes and reporting Time Domain behaviors respectively corresponding to the M−N1 CSI Reporting Settings among the M CSI Reporting Settings other than the N1 CSI Reporting Setting(s).

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, transmission priority classes of M−N1 pieces of CSI among the M pieces of CSI other than the N1 piece(s) of CSI are related to at least one of reporting setting indexes, parameter groups comprised by CSI, cell indexes or reporting Time Domain behaviors respectively corresponding to the M−N1 CSI Reporting Settings among the M CSI Reporting Settings other than the N1 CSI Reporting Setting(s).

In one subembodiment, the transmission priority class of CSI whose corresponding reporting Time Domain behavior is semi-persistent reporting is higher than that of CSI whose corresponding reporting Time Domain behavior is Periodic reporting.

In one subembodiment, the transmission priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the transmission priority class of CSI whose corresponding cell index is an index of a Primary Cell (PCell) is higher than that of CSI whose corresponding cell index is an index of a Secondary Cell (SCell).

In one subembodiment, the transmission priority class of CSI whose corresponding reporting setting index is smaller is higher than that of CSI whose corresponding reporting setting index is larger.

In one subembodiment, the transmission priority class of CSI whose corresponding reporting setting index is larger is higher than that of CSI whose corresponding reporting setting index is smaller.

In one embodiment, the Embodiment 7 corresponds to a schematic diagram of whether N antenna port groups are spatially associated with a first antenna port group being used to determine M CSI Reporting Settings out of N CSI Reporting Settings, wherein N1 CSI Reporting Setting(s) is(are) composed of CSI Reporting Setting(s) among the N CSI Reporting Settings, of which each CSI Reporting Setting corresponds to one of the N antenna port groups spatially associated with the first antenna port group, N1 being less than the M.

Embodiment 8

Figure 8:
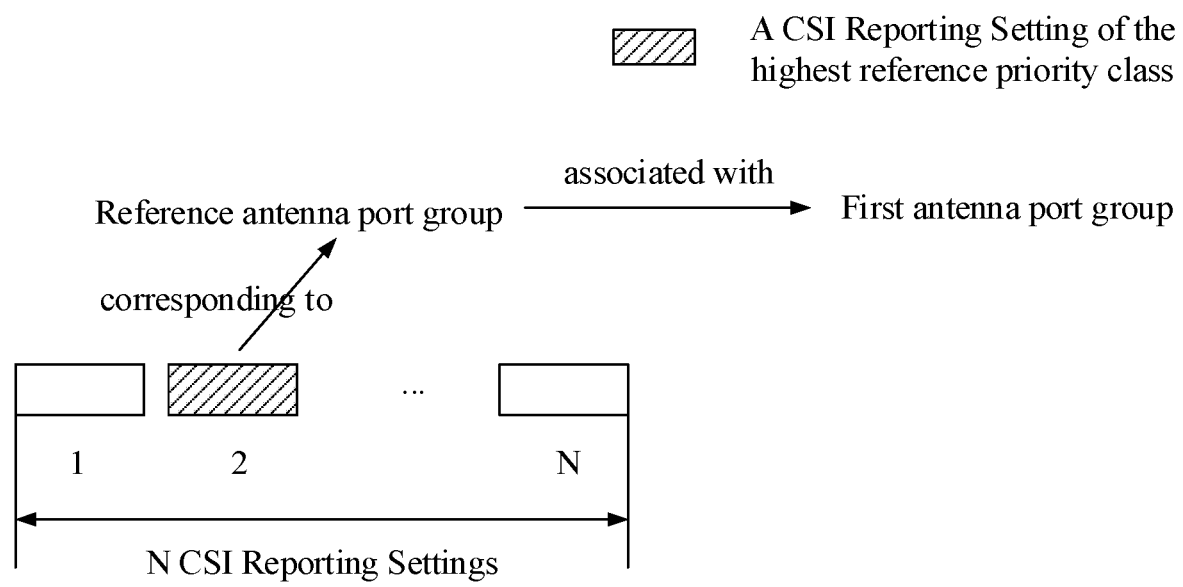
FIG. 8 illustrates a schematic diagram of determining a first antenna port group according to one embodiment of the present disclosure.

Embodiment 8 illustrates a schematic diagram of determining a first antenna port group, as shown in FIG. 8.

In Embodiment 8, a reference CSI Reporting Setting is one CSI Reporting Setting of the highest reference priority class among the N CSI Reporting Settings, and a reference antenna port group is one of the N antenna port groups in the present disclosure that corresponds to one of the N radio resources in the present disclosure being associated with the reference CSI Reporting Setting, the reference antenna port group being associated with the first antenna port group.

In one embodiment, the first antenna port group comprises the reference antenna port group.

In one embodiment, the M is equal to the N, the first radio resource is one of the J radio resources that is capable of transmitting all pieces of CSI corresponding to the N CSI Reporting Settings while comprising a minimum number of Resource Elements (RE).

In one embodiment, the M is less than the N, the first radio resource is one of the J radio resources that comprises a maximum number of REs.

In one embodiment, reference priority classes of the N pieces of CSI are related to reporting setting indexes, parameter groups comprised by CSI, cell indexes and reporting Time Domain behaviors respectively corresponding to the N CSI Reporting Settings.

In one subembodiment, the reference priority class of CSI whose corresponding reporting Time Domain behavior is semi-persistent reporting is higher than that of CSI whose corresponding reporting Time Domain behavior is Periodic reporting.

In one subembodiment, the reference priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the reference priority class of CSI whose corresponding cell index is an index of a Primary Cell (PCell) is higher than that of CSI whose corresponding cell index is an index of a Secondary Cell (SCell).

In one subembodiment, the reference priority class of CSI whose corresponding reporting setting index is smaller is higher than that of CSI whose corresponding reporting setting index is larger.

In one subembodiment, the reference priority class of CSI whose corresponding reporting setting index is larger is higher than that of CSI whose corresponding reporting setting index is smaller.

In one embodiment, reference priority classes of the N pieces of CSI are related to at least one of reporting setting indexes, parameter groups comprised by CSI, cell indexes or reporting Time Domain behaviors respectively corresponding to the N CSI Reporting Settings.

In one subembodiment, the reference priority class of CSI whose corresponding reporting Time Domain behavior is semi-persistent reporting is higher than that of CSI whose corresponding reporting Time Domain behavior is Periodic reporting.

In one subembodiment, the reference priority class of CSI whose corresponding parameter group comprises at least one of a CRI, a RSRP, or an SSBRI is higher than that of CSI whose corresponding parameter group comprises at least one of RI, a PMI, a CQI, or an SLI.

In one subembodiment, the reference priority class of CSI whose corresponding cell index is an index of a Primary Cell (PCell) is higher than that of CSI whose corresponding cell index is an index of a Secondary Cell (SCell).

In one subembodiment, the reference priority class of CSI whose corresponding reporting setting index is smaller is higher than that of CSI whose corresponding reporting setting index is larger.

In one subembodiment, the reference priority class of CSI whose corresponding reporting setting index is larger is higher than that of CSI whose corresponding reporting setting index is smaller.

Embodiment 9

Figure 9:
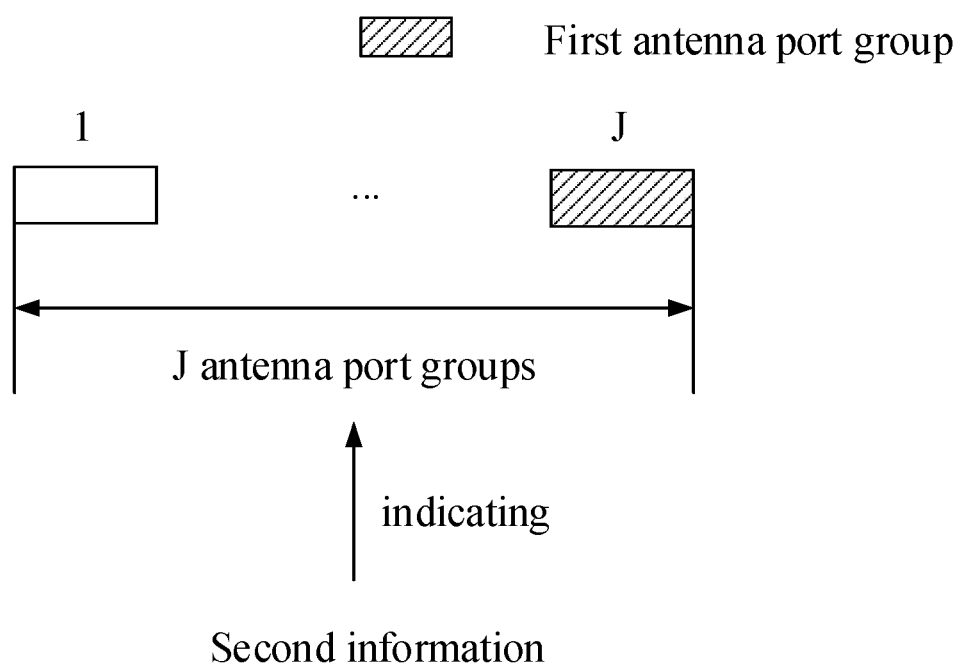
FIG. 9 illustrates a schematic diagram of determining a first antenna port group according to another embodiment of the present disclosure.
Figure 10A:
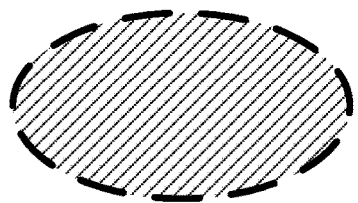
FIG. 10A-FIG. 10B respectively illustrate a schematic diagram of a first given antenna port group being spatially associated with a second given antenna port group according to one embodiment of the present disclosure.
Figure 10A:
Figure 10A:
Figure 10B:
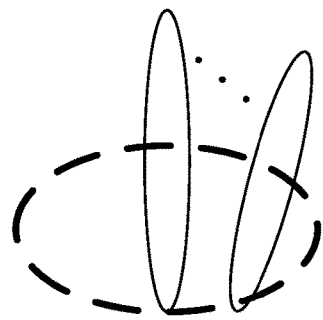
Figure 10B:
Figure 10B:
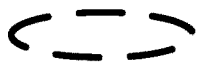
Figure 11A:
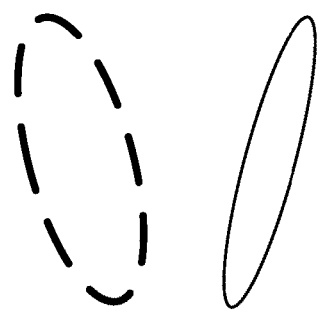
FIG. 11A-FIG. 11B respectively illustrate a schematic diagram of a first given antenna port group not being spatially associated with a second given antenna port group according to one embodiment of the present disclosure.
Figure 11A:
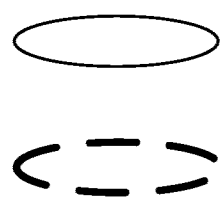
Figure 11B:
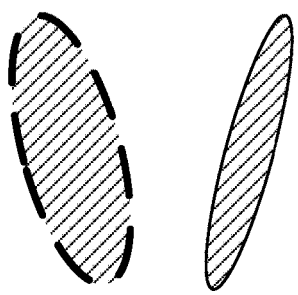
Figure 11B:
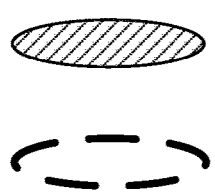

Embodiment 9 illustrates another schematic diagram of determining a first antenna port group, as shown in FIG. 9.

In Embodiment 9, the second information in the present disclosure is also used to indicate J antenna port groups, the J radio resources in the present disclosure respectively correspond to the J antenna port groups, and the first antenna port group is an antenna port group corresponding to the first radio resource among the J antenna port groups.

In one embodiment, the second antenna port group is an antenna port group corresponding to the second radio resource among the J antenna port groups.

In one embodiment, the second information also indicates J antenna port groups explicitly.

In one embodiment, the second information also indicates J antenna port groups implicitly.

Embodiment 10

Embodiment 10A-Embodiment 10B respectively illustrate a schematic diagram of a first given antenna port group being spatially associated with a second given antenna port group.

In Embodiment 10, the first given antenna port group corresponds to one of M antenna port group(s) among the N antenna port groups that respectively corresponds(correspond) to the M CSI Reporting Setting(s), or, the first given antenna port group corresponds to one of the N antenna port groups corresponding to any of the N1 CSI Reporting Setting(s); the second given antenna port group corresponds to the first antenna port group in the present disclosure; or, the first given antenna port group corresponds to one of the K antenna port group(s) in the present disclosure, or, the first given antenna port group corresponds to one of the N antenna port groups corresponding to any of the N2 CSI Reporting Setting(s); the second given antenna port group corresponds to the second antenna port group in the present disclosure; or, the first given antenna port group corresponds to the reference antenna port group in the present disclosure; the second given antenna port group corresponds to the first antenna port group in the present disclosure.

In one embodiment, the phrase that the first given antenna port group is spatially associated with the second given antenna port group means that the second given antenna port group comprises all antenna ports in the first given antenna port group.

In one embodiment, the first given antenna port group is spatially associated with the second given antenna port group, a transmission or reception antenna or antenna group for a transmitted radio signal on the second given antenna port group comprises all transmission or reception antennas or antenna groups for a transmitted radio signal on the first given antenna port group.

In one embodiment, the first given antenna port group is spatially associated with the second given antenna port group, a transmission antenna or antenna group for a transmitted radio signal on the second given antenna port group comprises all transmission antennas or antenna groups for a transmitted radio signal on the first given antenna port group.

In one embodiment, the first given antenna port group is spatially associated with the second given antenna port group, a reception antenna or antenna group for a transmitted radio signal on the second given antenna port group comprises all reception antennas or antenna groups for a transmitted radio signal on the first given antenna port group.

In one embodiment, the first given antenna port group is spatially associated with the second given antenna port group, a transmission antenna or antenna group for a transmitted radio signal on the second given antenna port group comprises all reception antennas or antenna groups for a transmitted radio signal on the first given antenna port group.

In one embodiment, the first given antenna port group is spatially associated with the second given antenna port group, a reception antenna or antenna group for a transmitted radio signal on the second given antenna port group comprises all transmission antennas or antenna groups for a transmitted radio signal on the first given antenna port group.

In one embodiment, the first given antenna port group is spatially associated with the second given antenna port group, a second antenna group refers to one or more antenna groups for generating multi-antenna related transmission or multi-antenna related reception of a transmitted radio signal on the second given antenna port group, while a first antenna group refers to one or more antenna groups for generating multi-antenna related transmission or multi-antenna related reception of a transmitted radio signal on the first given antenna port group, and the second antenna group comprises all antennas or antenna group(s) in the first antenna group.

In one embodiment, the first given antenna port group is spatially associated with the second given antenna port group, a second antenna group refers to one or more antenna groups for generating multi-antenna related transmission of a transmitted radio signal on the second given antenna port group, while a first antenna group refers to one or more antenna groups for generating multi-antenna related transmission of a transmitted radio signal on the first given antenna port group, and the second antenna group comprises all antennas or antenna group(s) in the first antenna group.

In one embodiment, the first given antenna port group is spatially associated with the second given antenna port group, a second antenna group refers to one or more antenna groups for generating multi-antenna related reception of a transmitted radio signal on the second given antenna port group, while a first antenna group refers to one or more antenna groups for generating multi-antenna related reception of a transmitted radio signal on the first given antenna port group, and the second antenna group comprises all antennas or antenna group(s) in the first antenna group.

In one embodiment, the first given antenna port group is spatially associated with the second given antenna port group, a second antenna group refers to one or more antenna groups for generating multi-antenna related transmission of a transmitted radio signal on the second given antenna port group, while a first antenna group refers to one or more antenna groups for generating multi-antenna related reception of a transmitted radio signal on the first given antenna port group, and the second antenna group comprises all antennas or antenna group(s) in the first antenna group.

In one embodiment, the first given antenna port group is spatially associated with the second given antenna port group means that: the second given antenna port group comprises part of antenna ports in the first given antenna port group, and any antenna port in the first given antenna port group that does not belong to the second given antenna port group is Quasi Co-Located (QCL) with at least one antenna port in the second given antenna port group.

In one embodiment, the first given antenna port group is spatially associated with the second given antenna port group means that: the second given antenna port group comprises part of antenna ports in the first given antenna port group, and any antenna port in the first given antenna port group that does not belong to the second given antenna port group is QCL with one antenna port in the second given antenna port group.

In one embodiment, the first given antenna port group is spatially associated with the second given antenna port group means that: the second given antenna port group comprises part of antenna ports in the first given antenna port group, and any antenna port in the first given antenna port group that does not belong to the second given antenna port group is spatial Quasi Co-Located (QCL) with at least one antenna port in the second given antenna port group.

In one embodiment, the first given antenna port group is spatially associated with the second given antenna port group means that: the second given antenna port group comprises part of antenna ports in the first given antenna port group, and any antenna port in the first given antenna port group that does not belong to the second given antenna port group is spatial QCL with one antenna port in the second given antenna port group.

In one embodiment, the first given antenna port group is spatially associated with the second given antenna port group means that: any antenna port in the first given antenna port group is QCL with at least one antenna port in the second given antenna port group.

In one embodiment, the first given antenna port group is spatially associated with the second given antenna port group means that: any antenna port in the first given antenna port group is QCL with one antenna port in the second given antenna port group.

In one embodiment, the first given antenna port group is spatially associated with the second given antenna port group means that: any antenna port in the first given antenna port group is spatial QCL with at least one antenna port in the second given antenna port group.

In one embodiment, the first given antenna port group is spatially associated with the second given antenna port group means that: any antenna port in the first given antenna port group is spatial QCL with one antenna port in the second given antenna port group.

In one embodiment, two antenna ports being QCL means that all or part of large-scale properties of a radio signal transmitted from one of the two antenna ports can be used to infer all or part of large-scale properties of a radio signal transmitted from the other of the two antenna ports.

In one embodiment, two antenna ports being QCL means that there is at least one same QCL parameter shared by the two antenna ports, and the QCL parameter comprises multi-antenna related QCL parameters and multi-antenna unrelated QCL parameters.

In one embodiment, two antenna ports being QCL means that at least one QCL parameter of one of the two antenna ports can be used to infer at least one QCL parameter of the other of the two antenna ports.

In one embodiment, two antenna ports being QCL means that multi-antenna related reception of a radio signal transmitted from one of the two antenna ports can be used to infer multi-antenna related reception of a radio signal transmitted from the other of the two antenna ports.

In one embodiment, two antenna ports being QCL means that multi-antenna related transmission of a radio signal transmitted from one of the two antenna ports can be used to infer multi-antenna related transmission of a radio signal transmitted from the other of the two antenna ports.

In one embodiment, two antenna ports being QCL means that multi-antenna related reception of a radio signal transmitted from one of the two antenna ports can be used to infer multi-antenna related transmission of a radio signal transmitted from the other of the two antenna ports, a receiver of the radio signal transmitted from one of the two antenna ports is the same as a transmitter of the radio signal transmitted from the other of the two antenna ports.

In one embodiment, the multi-antenna related QCL parameters include one or more of angle of arrival, angle of departure, spatial correlation, multi-antenna related transmission or multi-antenna related reception.

In one embodiment, the multi-antenna unrelated QCL parameters include one or more of delay spread, Doppler spread, Doppler shift, path loss or average gain.

In one embodiment, two antenna ports being spatial QCL means that all or part of multi-antenna related large-scale properties of a radio signal transmitted from one of the two antenna ports can be used to infer all or part of multi-antenna related large-scale properties of a radio signal transmitted from the other of the two antenna ports.

In one embodiment, two antenna ports being spatial QCL means that there is at least one same multi-antenna related QCL parameter (spatial QCL parameter) shared by the two antenna ports.

In one embodiment, two antenna ports being spatial QCL means that at least one multi-antenna related QCL parameter of one of the two antenna ports can be used to infer at least one multi-antenna related QCL parameter of the other of the two antenna ports.

In one embodiment, two antenna ports being spatial QCL means that multi-antenna related reception of a radio signal transmitted from one of the two antenna ports can be used to infer multi-antenna related reception of a radio signal transmitted from the other of the two antenna ports.

In one embodiment, two antenna ports being spatial QCL means that multi-antenna related transmission of a radio signal transmitted from one of the two antenna ports can be used to infer multi-antenna related transmission of a radio signal transmitted from the other of the two antenna ports.

In one embodiment, two antenna ports being spatial QCL means that multi-antenna related reception of a radio signal transmitted from one of the two antenna ports can be used to infer multi-antenna related transmission of a radio signal transmitted from the other of the two antenna ports, a receiver of the radio signal transmitted from one of the two antenna ports is the same as a transmitter of the radio signal transmitted from the other of the two antenna ports.

In one embodiment, multi-antenna related large-scale properties of a given radio signal include one or more of angle of arrival, angle of departure, spatial correlation, multi-antenna related transmission or multi-antenna related reception.

In one embodiment, the multi-antenna related reception refers to Spatial Rx parameters.

In one embodiment, the multi-antenna related reception refers to a receiving beam.

In one embodiment, the multi-antenna related reception refers to a reception beamforming matrix.

In one embodiment, the multi-antenna related reception refers to a reception analog beamforming matrix.

In one embodiment, the multi-antenna related reception refers to a reception beamforming vector.

In one embodiment, the multi-antenna related reception refers to reception spatial filtering.

In one embodiment, the multi-antenna related transmission refers to Spatial Tx parameters.

In one embodiment, the multi-antenna related transmission refers to a transmitting beam.

In one embodiment, the multi-antenna related transmission refers to a transmission beamforming matrix.

In one embodiment, the multi-antenna related transmission refers to a transmission analog beamforming matrix.

In one embodiment, the multi-antenna related transmission refers to a transmission beamforming vector.

In one embodiment, the multi-antenna related transmission refers to a transmission spatial filtering.

In one embodiment, the Embodiment 10A corresponds to a schematic diagram of the first given antenna port group being spatially associated with the second given antenna port group, wherein a transmitting beam of the first given antenna port group is the same as a transmitting beam for the second given antenna port group.

In one embodiment, the Embodiment 10B corresponds to a schematic diagram of the first given antenna port group being spatially associated with the second given antenna port group, wherein a transmitting beam of the first given antenna port group comprises a transmitting beam for the second given antenna port group.

Embodiment 11

Embodiment 11A-Embodiment 11B respectively illustrate a schematic diagram of a first given antenna port group not being spatially associated with a second given antenna port group.

In Embodiment 11, the first given antenna port group corresponds to one of the N antenna port groups in the present disclosure, or, the first given antenna port group corresponds to one of the N antenna port groups corresponding to any of the N2 CSI Reporting Setting(s) in the present disclosure; the second given antenna port group corresponds to the first antenna port group in the present disclosure; or, the first given antenna port group corresponds to the second antenna port group in the present disclosure, while the second given antenna port group corresponds to the first antenna port group in the present disclosure; or, the first given antenna port group corresponds to one of the M antenna port group(s) in the present disclosure, while the second given antenna port group corresponds to the second antenna port group in the present disclosure; or, the first given antenna port group corresponds to one of the K antenna port group(s) in the present disclosure, while the second given antenna port group corresponds to the first antenna port group in the present disclosure.

In one embodiment, the phrase that the first given antenna port group is not spatially associated with the second given antenna port group means that the second given antenna port group does not comprise all antenna ports in the first given antenna port group.

In one embodiment, the phrase that the first given antenna port group is not spatially associated with the second given antenna port group means that the second given antenna port group does not comprise at least one antenna port in the first given antenna port group.

In one embodiment, the phrase that the first given antenna port group is not spatially associated with the second given antenna port group means that all antenna ports in the second given antenna port group can transmit radio signals at the same as all antenna ports in the first given antenna port.

In one embodiment, the phrase that the first given antenna port group is not spatially associated with the second given antenna port group means that a radio signal transmitted from any antenna port in the second given antenna port group and a radio signal transmitted from any antenna port in the first given antenna port group can be received simultaneously.

In one embodiment, the phrase that the first given antenna port group is not spatially associated with the second given antenna port group means that a transmission of a radio signal on any antenna port in the second given antenna port group and a reception of a radio signal transmitted on any antenna port in the first given antenna port group can be performed simultaneously.

In one embodiment, the phrase that the first given antenna port group is not spatially associated with the second given antenna port group means that a transmission of a radio signal on any antenna port in the first given antenna port group and a reception of a radio signal transmitted on any antenna port in the second given antenna port group can be performed simultaneously.

In one embodiment, the phrase that the first given antenna port group is not spatially associated with the second given antenna port group means that a transmission or reception of a radio signal on any antenna port in the first given antenna port group can be performed at the same time as a transmission or reception of a radio signal on any antenna port in the second given antenna port group.

In one embodiment, the phrase that the first given antenna port group is not spatially associated with the second given antenna port group means that a transmission antenna or a reception antenna or an antenna group for a transmitted radio signal on any antenna port in the second given antenna port group and a transmission antenna or a reception antenna or an antenna group for a transmitted radio signal on any antenna port in the first given antenna port group do not comprise a same antenna or antenna port.

In one embodiment, the phrase that the first given antenna port group is not spatially associated with the second given antenna port group means that an antenna or antenna group for transmitting a radio signal on any antenna port in the second given antenna port group and an antenna or antenna group for transmitting a radio signal on any antenna port in the first given antenna port group do not comprise a same antenna or antenna port.

In one embodiment, the phrase that the first given antenna port group is not spatially associated with the second given antenna port group means that a reception antenna or an antenna group for a transmitted radio signal on any antenna port in the second given antenna port group and a reception antenna or an antenna group for a transmitted radio signal on any antenna port in the first given antenna port group do not comprise a same antenna or antenna port.

In one embodiment, the phrase that the first given antenna port group is not spatially associated with the second given antenna port group means that an antenna or antenna group for transmitting a radio signal on any antenna port in the second given antenna port group and a reception antenna or an antenna group for a transmitted radio signal on any antenna port in the first given antenna port group do not comprise a same antenna or antenna port.

In one embodiment, the phrase that the first given antenna port group is not spatially associated with the second given antenna port group means that an antenna or antenna group for transmitting a radio signal on any antenna port in the first given antenna port group and a reception antenna or an antenna group for a transmitted radio signal on any antenna port in the second given antenna port group do not comprise a same antenna or antenna port.

In one embodiment, the phrase that the first given antenna port group is not spatially associated with the second given antenna port group means that a second antenna group is one or more antenna groups for generating multi-antenna related transmission or multi-antenna related reception of a transmitted radio signal on any antenna port in the second given antenna port group, while a first antenna group is one or more antenna groups for generating multi-antenna related transmission or multi-antenna related reception of any antenna port in the first given antenna port group, and the first antenna group and the second antenna group do not comprise a same antenna or antenna group.

In one embodiment, the phrase that the first given antenna port group is not spatially associated with the second given antenna port group means that a second antenna group is one or more antenna groups for generating multi-antenna related transmission of a transmitted radio signal on any antenna port in the second given antenna port group, while a first antenna group is one or more antenna groups for generating multi-antenna related transmission of any antenna port in the first given antenna port group, and the first antenna group and the second antenna group do not comprise a same antenna or antenna group.

In one embodiment, the phrase that the first given antenna port group is not spatially associated with the second given antenna port group means that a second antenna group is one or more antenna groups for generating multi-antenna related reception of a transmitted radio signal on any antenna port in the second given antenna port group, while a first antenna group is one or more antenna groups for generating multi-antenna related reception of any antenna port in the first given antenna port group, and the first antenna group and the second antenna group do not comprise a same antenna or antenna group.

In one embodiment, the phrase that the first given antenna port group is not spatially associated with the second given antenna port group means that a second antenna group is one or more antenna groups for generating multi-antenna related transmission of a transmitted radio signal on any antenna port in the second given antenna port group, while a first antenna group is one or more antenna groups for generating multi-antenna related reception of any antenna port in the first given antenna port group, and the first antenna group and the second antenna group do not comprise a same antenna or antenna group.

In one embodiment, the phrase that the first given antenna port group is not spatially associated with the second given antenna port group means that a second antenna group is one or more antenna groups for generating multi-antenna related reception of a transmitted radio signal on any antenna port in the second given antenna port group, while a first antenna group is one or more antenna groups for generating multi-antenna related transmission of any antenna port in the first given antenna port group, and the first antenna group and the second antenna group do not comprise a same antenna or antenna group.

In one embodiment, the phrase that the first given antenna port group is not spatially associated with the second given antenna port group means that at least one antenna port in the first given antenna port group cannot transmit a radio signal at the same time as at least one antenna port in the second given antenna port group.

In one embodiment, the phrase that the first given antenna port group is not spatially associated with the second given antenna port group means that a transmission or reception of a radio signal on at least one antenna port in the first given antenna port group cannot be performed at the same time as a transmission or reception of a radio signal on at least one antenna port in the second given antenna port group.

In one embodiment, the phrase that the first given antenna port group is not spatially associated with the second given antenna port group means that a reception of a transmitted radio signal on at least one antenna port in the first given antenna port group and a reception of a transmitted radio signal on at least one antenna port in the second given antenna port group cannot be performed simultaneously.

In one embodiment, the phrase that the first given antenna port group is not spatially associated with the second given antenna port group means that a transmission of a radio signal on at least one antenna port in the first given antenna port group and a reception of a transmitted radio signal on at least one antenna port in the second given antenna port group cannot be performed simultaneously.

In one embodiment, the phrase that the first given antenna port group is not spatially associated with the second given antenna port group means that a transmission of a radio signal on at least one antenna port in the second given antenna port group and a reception of a transmitted radio signal on at least one antenna port in the first given antenna port group cannot be performed simultaneously.

In one embodiment, the phrase that the first given antenna port group is not spatially associated with the second given antenna port group means that any antenna port in the first given antenna port group cannot transmit a radio signal at the same time as at least one antenna port in the second given antenna port group.

In one embodiment, the phrase that the first given antenna port group is not spatially associated with the second given antenna port group means that a transmission or reception of a radio signal on any antenna port in the first given antenna port group cannot be performed at the same time as a transmission or reception of a radio signal on at least one antenna port in the second given antenna port group.

In one embodiment, the phrase that the first given antenna port group is not spatially associated with the second given antenna port group means that a reception of a transmitted radio signal on any antenna port in the first given antenna port group and a reception of a transmitted radio signal on at least one antenna port in the second given antenna port group cannot be performed simultaneously.

In one embodiment, the phrase that the first given antenna port group is not spatially associated with the second given antenna port group means that a transmission of a radio signal on any antenna port in the first given antenna port group and a reception of a transmitted radio signal on at least one antenna port in the second given antenna port group cannot be performed simultaneously.

In one embodiment, the phrase that the first given antenna port group is not spatially associated with the second given antenna port group means that a transmission of a radio signal on at least one antenna port in the second given antenna port group and a reception of a transmitted radio signal on any antenna port in the first given antenna port group cannot be performed simultaneously.

In one embodiment, the first given antenna port group is not spatially associated with the second given antenna port group, a transmission antenna or a reception antenna or an antenna group for a transmitted radio signal in the second given antenna port group comprises at least a transmission antenna or a reception antenna or an antenna group for a transmitted radio signal in the first given antenna port group.

In one embodiment, the first given antenna port group is not spatially associated with the second given antenna port group, a transmission antenna or an antenna group for a radio signal in the second given antenna port group comprises at least a transmission antenna or an antenna group for a radio signal in the first given antenna port group.

In one embodiment, the first given antenna port group is not spatially associated with the second given antenna port group, a reception antenna or an antenna group for a transmitted radio signal in the second given antenna port group comprises at least a reception antenna or an antenna group for a transmitted radio signal in the first given antenna port group.

In one embodiment, the first given antenna port group is not spatially associated with the second given antenna port group, a transmission antenna or an antenna group for a transmitted radio signal in the second given antenna port group comprises at least a reception antenna or an antenna group for a transmitted radio signal in the first given antenna port group.

In one embodiment, the first given antenna port group is not spatially associated with the second given antenna port group, a reception antenna or an antenna group for a transmitted radio signal in the second given antenna port group comprises at least a transmission antenna or an antenna group for a transmitted radio signal in the first given antenna port group.

In one embodiment, the first given antenna port group is not spatially associated with the second given antenna port group, a second antenna group refers to one or more antenna groups for generating multi-antenna related transmission or multi-antenna related reception of a transmitted radio signal on the second given antenna port group, while a first antenna group refers to one or more antenna groups for generating multi-antenna related transmission or multi-antenna related reception of a transmitted radio signal on the first given antenna port group, and the second antenna group comprises at least one antenna or antenna group in the first antenna group.

In one embodiment, the first given antenna port group is not spatially associated with the second given antenna port group, a second antenna group refers to one or more antenna groups for generating multi-antenna related transmission of a transmitted radio signal on the second given antenna port group, while a first antenna group refers to one or more antenna groups for generating multi-antenna related transmission of a transmitted radio signal on the first given antenna port group, and the second antenna group comprises at least one antenna or antenna group in the first antenna group.

In one embodiment, the first given antenna port group is not spatially associated with the second given antenna port group, a second antenna group refers to one or more antenna groups for generating multi-antenna related reception of a transmitted radio signal on the second given antenna port group, while a first antenna group refers to one or more antenna groups for generating multi-antenna related reception of a transmitted radio signal on the first given antenna port group, and the second antenna group comprises at least one antenna or antenna group in the first antenna group.

In one embodiment, the first given antenna port group is not spatially associated with the second given antenna port group, a second antenna group refers to one or more antenna groups for generating multi-antenna related transmission of a transmitted radio signal on the second given antenna port group, while a first antenna group refers to one or more antenna groups for generating multi-antenna related reception of a transmitted radio signal on the first given antenna port group, and the second antenna group comprises at least one antenna or antenna group in the first antenna group.

In one embodiment, the first given antenna port group is not spatially associated with the second given antenna port group, a second antenna group refers to one or more antenna groups for generating multi-antenna related reception of a transmitted radio signal on the second given antenna port group, while a first antenna group refers to one or more antenna groups for generating multi-antenna related transmission of a transmitted radio signal on the first given antenna port group, and the second antenna group comprises at least one antenna or antenna group in the first antenna group.

In one embodiment, the first given antenna port group is not spatially associated with the second given antenna port group means that any antenna port in the first given antenna port group is not QCL with any antenna port in the second given antenna port group.

In one embodiment, the first given antenna port group is not spatially associated with the second given antenna port group means that at least one antenna port in the first given antenna port group is not QCL with at least one antenna port in the second given antenna port group.

In one embodiment, the first given antenna port group is not spatially associated with the second given antenna port group means that any antenna port in the first given antenna port group is not spatial QCL with any antenna port in the second given antenna port group.

In one embodiment, the first given antenna port group is not spatially associated with the second given antenna port group means that at least one antenna port in the first given antenna port group is not spatial QCL with at least one antenna port in the second given antenna port group.

In one embodiment, two antenna ports not being QCL means that all or part of large-scale properties of a radio signal transmitted from one of the two antenna ports cannot be used to infer all or part of large-scale properties of a radio signal transmitted from the other of the two antenna ports.

In one embodiment, two antenna ports not being QCL means that one of the two antenna ports has at least one QCL parameter different from the other of the two antenna ports, and the QCL parameter comprises multi-antenna related QCL parameters and multi-antenna unrelated QCL parameters.

In one embodiment, two antenna ports not being QCL means that at least one QCL parameter of one of the two antenna ports cannot be used to infer at least one QCL parameter of the other of the two antenna ports.

In one embodiment, two antenna ports not being QCL means that multi-antenna related reception of a radio signal transmitted from one of the two antenna ports cannot be used to infer multi-antenna related reception of a radio signal transmitted from the other of the two antenna ports.

In one embodiment, two antenna ports not being QCL means that multi-antenna related transmission of a radio signal transmitted from one of the two antenna ports cannot be used to infer multi-antenna related transmission of a radio signal transmitted from the other of the two antenna ports.

In one embodiment, two antenna ports not being QCL means that multi-antenna related reception of a radio signal transmitted from one of the two antenna ports cannot be used to infer multi-antenna related transmission of a radio signal transmitted from the other of the two antenna ports; a receiver of the radio signal transmitted from one of the two antenna ports is the same as a transmitter of the radio signal transmitted from the other of the two antenna ports.

In one embodiment, two antenna ports not being spatial QCL means that all or part of multi-antenna related large-scale properties of a radio signal transmitted from one of the two antenna ports cannot be used to infer all or part of multi-antenna related large-scale properties of a radio signal transmitted from the other of the two antenna ports.

In one embodiment, two antenna ports not being spatial QCL means that one of the two antenna ports has at least one multi-antenna related QCL parameter (spatial QCL parameter) different from the other of the two antenna ports.

In one embodiment, two antenna ports not being spatial QCL means that at least one multi-antenna related QCL parameter of one of the two antenna ports cannot be used to infer at least one multi-antenna related QCL parameter of the other of the two antenna ports.

In one embodiment, two antenna ports not being spatial QCL means that multi-antenna related reception of a radio signal transmitted from one of the two antenna ports cannot be used to infer multi-antenna related reception of a radio signal transmitted from the other of the two antenna ports.

In one embodiment, two antenna ports not being spatial QCL means that multi-antenna related transmission of a radio signal transmitted from one of the two antenna ports cannot be used to infer multi-antenna related transmission of a radio signal transmitted from the other of the two antenna ports.

In one embodiment, two antenna ports not being spatial QCL means that multi-antenna related reception of a radio signal transmitted from one of the two antenna ports cannot be used to infer multi-antenna related transmission of a radio signal transmitted from the other of the two antenna ports; a receiver of the radio signal transmitted from one of the two antenna ports is the same as a transmitter of the radio signal transmitted from the other of the two antenna ports.

In one embodiment, the Embodiment 11A corresponds to a schematic diagram of the first given antenna port group not being spatially associated with the second given antenna port group, wherein a transmitting beam of the first given antenna port group is different from that of the second given antenna port group.

In one embodiment, the Embodiment 11B corresponds to a schematic diagram of the first given antenna port group not being spatially associated with the second given antenna port group, wherein a transmitting beam of the first given antenna port group only comprises part of a transmitting beam of the second given antenna port group.

Embodiment 12

Figure 12:
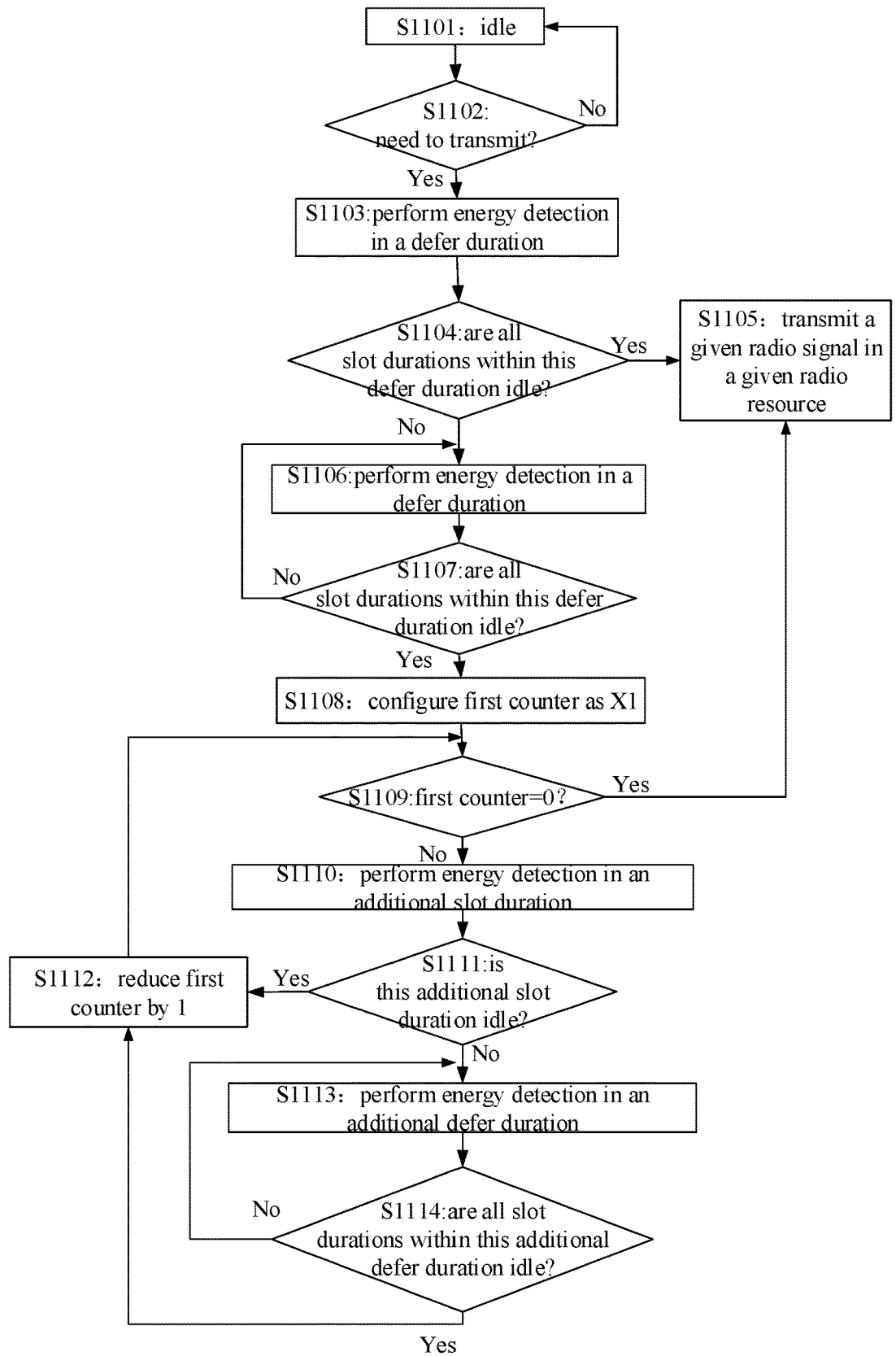
FIG. 12 illustrates a schematic diagram of a given sub-access detection being used to determine whether to transmit a given radio signal in a given radio resource according to one embodiment of the present disclosure.
Figure 13A:
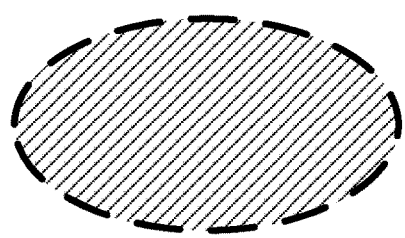
FIG. 13A-FIG. 13B respectively illustrate a schematic diagram of a given antenna port being spatially correlated to a given energy detection according to one embodiment of the present disclosure.
Figure 13A:
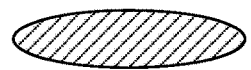
Figure 13A:
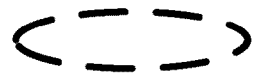
Figure 13B:
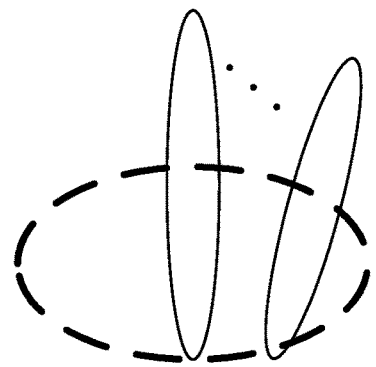
Figure 13B:
Figure 13B:
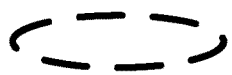

Embodiment 12 illustrates a schematic diagram of a given sub-access detection being used to determine whether to transmit a given radio signal in a given radio resource; as shown in FIG. 12.

In Embodiment 12, a given time is a start time for the given radio resource, a given sub-band comprises frequency-domain resources of the given radio resource, and the given sub-access detection comprises performing X energy detection(s) respectively in X time sub-pool(s) in the given sub-band to obtain X detection value(s), X being a positive integer. The given sub-access detection corresponds to one of the J1 sub-access detection(s) in the present disclosure, or, the given sub-access detection corresponds to one of the J sub-access detections in the present disclosure; the given radio resource corresponds to one of the J radio resources in the present disclosure, and the given radio signal corresponds to a radio signal carrying part of or all CSI corresponding to the N CSI Reporting Settings in the present disclosure. The process of the given access detection can be depicted by a flowchart in FIG. 12.

In Embodiment 12, the UE in the present disclosure is idle in step S1101, and determines whether there is need to transmit in step S1102; performs energy detection in a defer duration in step S1103; and determines in step S1104 whether all slot durations within the defer duration are idle, if yes, move forward to step S1105 to transmit a given radio signal in a given radio resource; otherwise, move forward to step S1106 to perform energy detection in a defer duration; the UE determines in step S1107 whether all slot durations within the defer duration are idle, if yes, move forward to step S1108 to configure a first counter as X1; otherwise, go back to step S1106; the UE determines whether the first counter is equal to 0 in step S1109, if yes, move back to step S1105 to transmit a given radio signal in a given radio resource; otherwise, move forward to step S1110 to perform energy detection in an additional slot duration; and determines in step S1111 whether the additional slot duration is idle, if yes, move forward to step S1112 to reduce the first counter by 1 and then go back to step S1109; otherwise, move forward to step S1113 to perform energy detection in an additional defer duration; the UE determines in step S1114 whether all slot durations within the additional defer duration are idle, if yes, move back to step S1112; otherwise go back to step S1113.

In one embodiment, the X1 is equal to 0, the UE determines in step S1104 or step S1108 whether all slot durations within the defer duration are idle, when a result of the given sub-access detection is that a channel is idle, the given radio signal can be transmitted at the given time; otherwise, the given radio signal cannot be transmitted at the given time.

In one embodiment, the X1 is no less than 0, the UE determines in step S1104 that not all slot durations within the defer duration are idle. Before the given time, the first counter in FIG. 12 is cleared to 0, when a result of the given sub-access detection is that a channel is idle, the given radio signal can be transmitted at the given time; otherwise, the given radio signal cannot be transmitted at the given time. The prerequisites for clearance of the first counter is that each of X1 detection value(s) among the X detection value(s) respectively corresponding to X1 time sub-pool(s) among the X time sub-pool(s) is lower than a first reference threshold, a start time for the X1 time sub-pool(s) is behind the step S1108 in FIG. 12.

In one embodiment, the X time sub-pool(s) comprises (comprise) all defer durations in FIG. 12.

In one embodiment, the X time sub-pool(s) comprises (comprise) part of defer durations in FIG. 12.

In one embodiment, the X time sub-pool(s) comprises (comprise) all defer durations and all additional slot durations in FIG. 12.

In one embodiment, the X time sub-pool(s) comprises (comprise) all defer durations and part of additional slot durations in FIG. 12.

In one embodiment, the X time sub-pool(s) comprises (comprise) all defer durations, all additional slot durations and all additional defer durations in FIG. 12.

In one embodiment, the X time sub-pool(s) comprises (comprise) all defer durations, part of additional slot durations and all additional defer durations in FIG. 12.

In one embodiment, the X time sub-pool(s) comprises (comprise) all defer durations, part of additional slot durations and part of additional defer durations in FIG. 12.

In one embodiment, any of the X time sub-pool(s) lasts either 16 μs or 9 μs.

In one embodiment, any slot duration in a given time duration is one of the X time sub-pool(s); the given time duration is any duration among all defer durations, all additional slot durations and all additional defer durations comprised by FIG. 12.

In one embodiment, performing energy detection in a given time duration refers to performing energy detection in all slot durations within the given time duration; the given time duration is any duration among all defer durations, all additional slot durations and all additional defer durations comprised by FIG. 12.

In one embodiment, a given time duration being determined to be idle through energy detection means that all slot durations comprised in the given time duration are determined as idle; the given time duration is any duration among all defer durations, all additional slot durations and all additional defer durations comprised by FIG. 12.

In one embodiment, a given slot duration being determined to be idle through energy detection means that the UE senses power of all radio signals in the given sub-band in a given time unit and averages in time, from which a received power obtained is lower than the first reference threshold; the given time unit is a consecutive duration within the given slot duration.

In one subembodiment, the given time unit lasts no shorter than 4 μs.

In one embodiment, a given slot duration being determined to be idle through energy detection means that the UE senses energy of all radio signals in the given sub-band in a given time unit and averages in time, from which a received energy obtained is lower than the first reference threshold; the given time unit is a consecutive duration within the given slot duration.

In one subembodiment, the given time unit lasts no shorter than 4 μs.

In one embodiment, performing energy detection in a given time duration refers to performing energy detection in time sub-pool(s) within the given time duration; the given time duration is any duration among all defer durations, all additional slot durations and all additional defer durations comprised by FIG. 12, and each of the time sub-pool(s) belongs to the X time sub-pool(s).

In one embodiment, a given time duration being determined to be idle through energy detection means that each of detection value(s) obtained through energy detection on time sub-pool(s) within the given time duration is lower than the first reference threshold; the given time duration is any duration among all defer durations, all additional slot durations and all additional defer durations comprised by FIG. 12, each of the time sub-pool(s) belongs to the X time sub-pool(s), and each of the detection value(s) belongs to the X detection value(s).

In one embodiment, a defer duration lasts 16 μs plus Z1 time(s) the length of 9 μs, Z1 being a positive integer.

In one subembodiment, a defer duration comprises Z1+1 time sub-pools among the X time sub-pools.

In one reference embodiment of the above sub-embodiment, a first time sub-pool among the Z1+1 time sub-pools lasts 16 μs, while each of the Z1 time sub-pool(s) lasts 9 μs.

In one subembodiment, a given priority class is used to determine the Z1.

In one reference embodiment of the above sub-embodiment, the given priority class is a Channel Access Priority Class, for the definition of the Channel Access Priority Class, refer to 3GPP TS36.213, section 15.

In one subembodiment, the Z1 is one of 1, 2, 3 and 7.

In one embodiment, a defer duration comprises multiple slot durations.

In one subembodiment, a first slot duration and a second slot duration among the multiple slot durations are non-consecutive.

In one subembodiment, a first slot duration and a second slot duration among the multiple slot durations are spaced by a time interval of 7 ms.

In one embodiment, an additional defer duration lasts 16 μs plus Z2 time(s) the length of 9 μs, Z2 being a positive integer.

In one subembodiment, an additional defer duration comprises Z2+1 time sub-pools among the X time sub-pools.

In one reference embodiment of the above sub-embodiment, a first time sub-pool among the Z2+1 time sub-pools lasts 16 μs, while each of the Z2 time sub-pool(s) lasts 9 μs.

In one subembodiment, the given priority class is used to determine the Z2.

In one subembodiment, the Z2 is one of 1, 2, 3 and 7.

In one embodiment, a defer duration lasts as long as an additional defer duration.

In one embodiment, the Z1 is equal to the Z2.

In one embodiment, an additional defer duration comprises multiple slot durations.

In one subembodiment, a first slot duration and a second slot duration among the multiple slot durations are non-consecutive.

In one subembodiment, a first slot duration and a second slot duration among the multiple slot durations are spaced by a time interval of 7 ms.

In one embodiment, a slot duration lasts 9 μs.

In one embodiment, a slot duration is one of the X time sub-pool(s).

In one embodiment, an additional slot duration lasts 9 μs.

In one embodiment, an additional slot duration comprises one of the X time sub-pool(s).

In one embodiment, the X energy detection(s) is(are) used to determine whether the given sub-band is idle.

In one embodiment, the X energy detection(s) is(are) used to determine whether the given sub-band can be used by the UE for transmitting the given radio signal.

In one embodiment, each of the X detection value(s) is measured by dBm.

In one embodiment, each of the X detection value(s) is measured by mW.

In one embodiment, each of the X detection value(s) is measured by J.

In one embodiment, the X1 is less than the X.

In one embodiment, the X is greater than 1.

In one embodiment, the first reference threshold is measured by dBm.

In one embodiment, the first reference threshold is measured by mW.

In one embodiment, the first reference threshold is measured by J.

In one embodiment, the first reference threshold is equal to or less than −72 dBm.

In one embodiment, the first reference threshold is any value equal to or less than a first given value.

In one subembodiment, the first given value is predefined.

In one subembodiment, the first given value is configured by a higher-layer signaling.

In one embodiment, the first reference threshold is selected by the UE liberally given that the first reference threshold is equal to or less than a first given value.

In one subembodiment, the first given value is predefined.

In one subembodiment, the first given value is configured by a higher-layer signaling.

In one embodiment, the X energy detection(s) is(are) energy detection(s) in a process of Cat 4 Listen Before Talk (LBT). The X1 refers to CWp in the process of Cat 4 LBT, the CWp is contention window size, and the detailed definition of the CWp can be found in 3GPP TS36.213, section 15.

In one embodiment, among detection value(s) of the X detection values not belonging to the X1 detection value(s) at least one detection value is lower than the first reference threshold.

In one embodiment, among detection value(s) of the X detection values not belonging to the X1 detection value(s) at least one detection value is no lower than the first reference threshold.

In one embodiment, any two of the X1 time sub-pools are of equal duration.

In one embodiment, at least two of the X1 time sub-pools are of unequal durations.

In one embodiment, the X1 time sub-pool(s) comprises (comprise) a latest time sub-pool of the X time sub-pools.

In one embodiment, the X1 time sub-pool(s) comprises (comprise) only slot durations in an eCCA.

In one embodiment, the X time sub-pools comprise the X1 time sub-pool(s) and X2 time sub-pool(s), and any of the X2 time sub-pool(s) does not belong to the X1 time sub-pool(s); X2 is a positive integer no greater than a difference between the X and the X1.

In one subembodiment, the X2 time sub-pool(s) comprises(comprise) slot durations in an initial CCA.

In one subembodiment, positions of the X2 time sub-pools among the X time sub-pools are consecutive.

In one subembodiment, at least one of the X2 time sub-pool(s) corresponds to a detection value lower than the first reference threshold.

In one subembodiment, at least one of the X2 time sub-pool(s) corresponds to a detection value no lower than the first reference threshold.

In one subembodiment, the X2 time sub-pool(s) comprises(comprise) all slot durations within all defer durations.

In one subembodiment, the X2 time sub-pool(s) comprises(comprise) all slot durations within at least one additional defer duration.

In one subembodiment, the X2 time sub-pool(s) comprises(comprise) at least one additional slot duration.

In one subembodiment, the X2 time sub-pool(s) comprises(comprise) all slot durations within all additional slot durations and additional defer durations in FIG. 12 determined to be non-idle through energy detection.

In one embodiment, the X1 time sub-pool(s) respectively belongs(belong) to X1 sub-pool set(s), and any of the X1 sub-pool set(s) comprises a positive integer number of time sub-pool(s) among the X time sub-pools; any time sub-pool out of the X1 sub-pool set(s) corresponds to a detection value lower than the first reference threshold.

In one subembodiment, at least one of the X1 sub-pool set(s) comprises one time sub-pool.

In one subembodiment, at least one of the X1 sub-pool set(s) comprises more than one time sub-pool.

In one subembodiment, at least two of the X1 sub-pool sets comprise unequal numbers of time sub-pools.

In one subembodiment, none of the X time sub-pools belongs to two of the X1 sub-pool sets at the same time.

In one subembodiment, each time sub-pool comprised in any of the X1 sub-pool set(s) belongs to a same additional defer duration or additional slot duration determined to be idle through energy detection.

In one subembodiment, among time sub-pool(s) of the X time sub-pools not belonging to the X1 sub-pool set(s) there is at least one time sub-pool corresponding to a detection value lower than the first reference threshold.

In one subembodiment, among time sub-pool(s) of the X time sub-pools not belonging to the X1 sub-pool set(s) there is at least one time sub-pool corresponding to a detection value not lower than the first reference threshold.

Embodiment 13

Embodiment 13A-Embodiment 13B respectively illustrate a schematic diagram of a given antenna port being spatially correlated to a given energy detection.

In Embodiment 13, the given antenna port corresponds to any antenna port in the first antenna port group in the present disclosure, and the given energy detection corresponds to any energy detection in the first sub-access detection in the present disclosure; or, the given antenna port corresponds to any antenna port in the first antenna port group in the present disclosure, and the given energy detection corresponds to any energy detection in the third sub-access detection in the present disclosure; or, the given antenna port corresponds to any antenna port in the second antenna port group in the present disclosure, and the given energy detection corresponds to any energy detection in the second sub-access detection in the present disclosure; or, the given antenna port corresponds to any antenna port in the second antenna port group in the present disclosure, and the given energy detection corresponds to any energy detection in the fourth sub-access detection in the present disclosure; or, the given antenna port corresponds to one of the J antenna port groups in the present disclosure, and the given energy detection corresponds to one of the J1 sub-access detection(s) in the present disclosure, or, the given energy detection corresponds to one of the J sub-access detections in the present disclosure.

In one embodiment, the phrase of a given antenna port being spatially correlated to a given energy detection means that multi-antenna related reception employed by the given energy detection can be used to infer multi-antenna related transmission of the given antenna port, or multi-antenna related transmission of the given antenna port can be used to infer multi-antenna related reception employed by the given energy detection.

In one embodiment, the phrase of a given antenna port being spatially correlated to a given energy detection means that multi-antenna related reception employed by the given energy detection is the same as multi-antenna related transmission of the given antenna port.

In one embodiment, the phrase of a given antenna port being spatially correlated to a given energy detection means that multi-antenna related reception employed by the given energy detection includes multi-antenna related transmission of the given antenna port.

In one embodiment, the phrase of a given antenna port being spatially correlated to a given energy detection means that a beam width corresponding to a reception beamforming matrix employed by the given energy detection is no smaller than that corresponding to a transmission beamforming matrix for the given antenna port.

In one embodiment, the phrase of a given antenna port being spatially correlated to a given energy detection means that a beam direction corresponding to a reception beamforming matrix employed by the given energy detection includes a beam direction corresponding to a transmission beamforming matrix for the given antenna port.

In one embodiment, the phrase of a given antenna port being spatially correlated to a given energy detection means that a beam width corresponding to a receiving beam employed by the given energy detection is larger than that corresponding to a transmitting beam for the given antenna port.

In one embodiment, the phrase of a given antenna port being spatially correlated to a given energy detection means that a receiving beam employed by the given energy detection comprises a transmitting beam for the given antenna port.

In one embodiment, the phrase of a given antenna port not being spatially correlated to a given energy detection means that multi-antenna related reception employed by the given energy detection cannot be used to infer multi-antenna related transmission of the given antenna port, or multi-antenna related transmission of the given antenna port cannot be used to infer multi-antenna related reception employed by the given energy detection.

In one embodiment, the phrase of a given antenna port not being spatially correlated to a given energy detection means that multi-antenna related reception employed by the given energy detection is different from multi-antenna related transmission of the given antenna port.

In one embodiment, the phrase of a given antenna port not being spatially correlated to a given energy detection means that multi-antenna related reception employed by the given energy detection does not include multi-antenna related transmission of the given antenna port.

In one embodiment, the phrase of a given antenna port not being spatially correlated to a given energy detection means that a beam width corresponding to a reception beamforming matrix employed by the given energy detection is smaller than that corresponding to a transmission beamforming matrix for the given antenna port.

In one embodiment, the phrase of a given antenna port not being spatially correlated to a given energy detection means that a beam direction corresponding to a reception beamforming matrix employed by the given energy detection does not include a beam direction corresponding to a transmission beamforming matrix for the given antenna port.

In one embodiment, the phrase of a given antenna port not being spatially correlated to a given energy detection means that a beam width corresponding to a receiving beam employed by the given energy detection is smaller than that corresponding to a transmitting beam for the given antenna port.

In one embodiment, the phrase of a given antenna port not being spatially correlated to a given energy detection means that a receiving beam employed by the given energy detection does not comprise a transmitting beam for the given antenna port.

In one embodiment, a number of antennas employed by the given energy detection is smaller than that of transmission antennas of the given antenna port.

In one embodiment, a number of antennas employed by the given energy detection is greater than 1.

In one embodiment, a number of transmission antennas of the given antenna port is greater than 1.

In one embodiment, the Embodiment 13A corresponds to a schematic diagram of the given antenna port being spatially correlated to the given energy detection, wherein a receiving beam employed by the given energy detection is the same as a transmitting beam of the given antenna port.

In one embodiment, the Embodiment 13B corresponds to a schematic diagram of the given antenna port being spatially correlated to the given energy detection, wherein a receiving beam employed by the given energy detection comprises a transmitting beam of the given antenna port.

Embodiment 14

Figure 14:
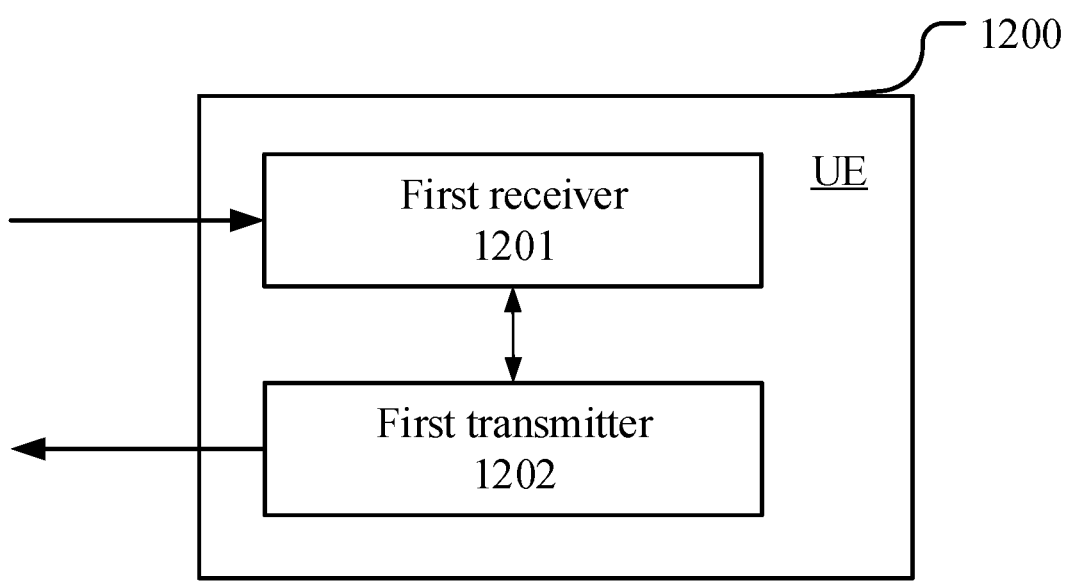
FIG. 14 illustrates a structure block diagram of a processing device in a UE according to one embodiment of the present disclosure.

Embodiment 14 illustrates a structure block diagram of a processing device in a UE, as shown in FIG. 14. In FIG. 14, a UE's processing device 1200 comprises a first receiver 1201 and a first transmitter 1202.

In one embodiment, the first receiver 1201 comprises the receiver 456, the receiving processor 452 and the controller/processor 490 in Embodiment 4.

In one embodiment, the first receiver 1201 comprises at least the first two of the receiver 456, the receiving processor 452 and the controller/processor 490 in Embodiment 4.

In one embodiment, the first transmitter 1202 comprises the transmitter 456, the transmitting processor 455 and the controller/processor 490 in Embodiment 4.

In one embodiment, the first transmitter 1202 comprises at least the first two of the transmitter 456, the transmitting processor 455 and the controller/processor 490 in Embodiment 4.

The first receiver 1201 receives first information, the first information being used to indicate N CSI Reporting Settings, the N CSI Reporting Settings respectively being associated with N radio resources, and N being a positive integer greater than 1; and receives second information, the second information being used to indicate J radio resource(s), and J being a positive integer.

The first transmitter 1202 transmits M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N.

In Embodiment 14, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

In one embodiment, each of M antenna port group(s) among the N antenna port groups that respectively corresponds(correspond) to the M CSI Reporting Setting(s) is spatially associated with the first antenna port group.

In one embodiment, when at least one antenna port group of M antenna port group(s) among the N antenna port groups that respectively corresponds(correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

In one embodiment, the first transmitter 1202 also comprises transmitting K piece(s) of CSI in a second radio resource, the K piece(s) of CSI respectively corresponding to K CSI Reporting Setting(s) among the N CSI Reporting Settings other than the M CSI Reporting Setting(s), K being a positive integer no greater than N−M; herein, the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group.

In one embodiment, the first receiver 1201 also performs an access detection to determine the first radio resource out of the J radio resources; herein, J is greater than 1.

In one embodiment, a reference CSI Reporting Setting is a CSI Reporting Setting with a highest reference priority among the N CSI Reporting Settings, and a reference antenna port group is one of the N antenna port groups corresponding to one of the N radio resources that is associated with the reference CSI Reporting Setting, the reference antenna port group being associated with the first antenna port group.

In one embodiment, the second information is also used to indicate J antenna port groups, the J radio resources respectively correspond to the J antenna port groups, and the first antenna port group is an antenna port group corresponding to the first radio resource among the J antenna port groups.

In one embodiment, the first receiver 1201 also receives third information; herein, the third information is used to indicate configuration information of the N radio resources.

Embodiment 15

Figure 15:
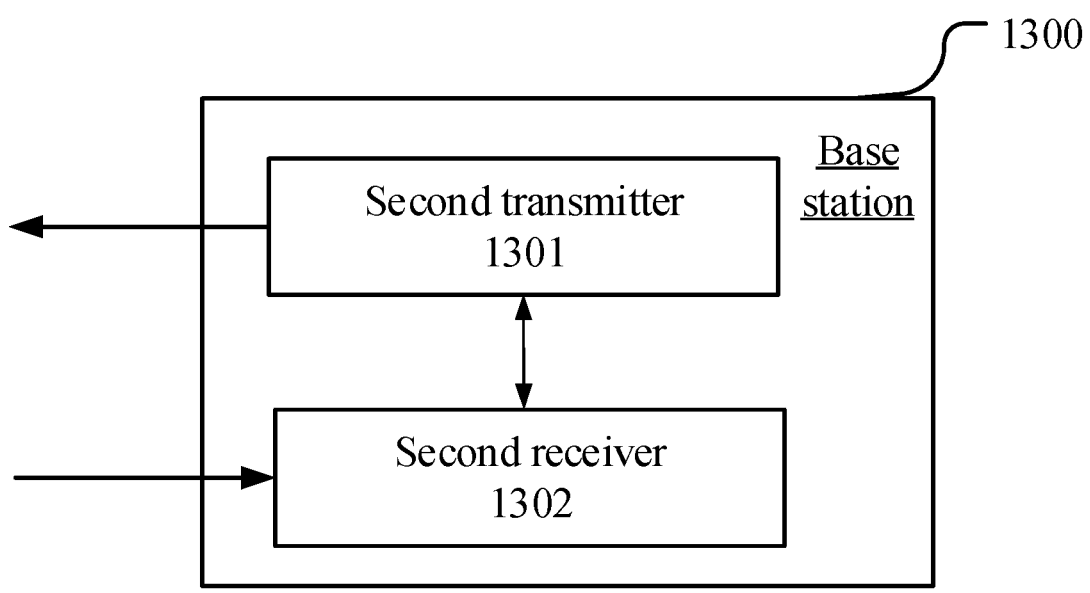
FIG. 15 illustrates a structure block diagram of a processing device in a base station according to one embodiment of the present disclosure.

Embodiment 15 illustrates a structure block diagram of a processing device in a base station, as shown in FIG. 15. In FIG. 15, a base station's processing device 1300 comprises a second transmitter 1301 and a second receiver 1302.

In one embodiment, the second transmitter 1301 comprises the transmitter 416, the transmitting processor 415 and the controller/processor 440 in Embodiment 4.

In one embodiment, the second transmitter 1301 comprises at least the first two of the transmitter 416, the transmitting processor 415 and the controller/processor 440 in Embodiment 4.

In one embodiment, the second receiver 1302 comprises the receiver 416, the receiving processor 412 and the controller/processor 440 in Embodiment 4.

In one embodiment, the second receiver 1302 comprises at least the first two of the receiver 416, the receiving processor 412 and the controller/processor 440 in Embodiment 4.

The second transmitter 1301 transmits first information, the first information being used to indicate N CSI Reporting Settings, the N CSI Reporting Settings respectively being associated with N radio resources, and N being a positive integer greater than 1; and transmits second information, the second information being used to indicate J radio resource(s), and J being a positive integer.

The second receiver 1302 receives M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N.

In Embodiment 15, the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

In one embodiment, each of M antenna port group(s) among the N antenna port groups that respectively corresponds(correspond) to the M CSI Reporting Setting(s) is spatially associated with the first antenna port group.

In one embodiment, when at least one antenna port group of M antenna port group(s) among the N antenna port groups that respectively corresponds(correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

In one embodiment, the second receiver 1302 also comprises receiving K piece(s) of CSI in a second radio resource, the K piece(s) of CSI respectively corresponding to K CSI Reporting Setting(s) among the N CSI Reporting Settings other than the M CSI Reporting Setting(s), K being a positive integer no greater than N−M; herein, the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group.

In one embodiment, the second receiver 1302 also monitors the J radio resources to determine the first radio resource; herein, a receiver of the first information performs an access detection to determine the first radio resource out of the J radio resource, J being greater than 1.

In one embodiment, a reference CSI Reporting Setting is a CSI Reporting Setting with a highest reference priority among the N CSI Reporting Settings, and a reference antenna port group is one of the N antenna port groups corresponding to one of the N radio resources that is associated with the reference CSI Reporting Setting, the reference antenna port group being associated with the first antenna port group.

In one embodiment, the second information is also used to indicate J antenna port groups, the J radio resources respectively correspond to the J antenna port groups, and the first antenna port group is an antenna port group corresponding to the first radio resource among the J antenna port groups.

In one embodiment, the second transmitter 1301 also transmits third information; herein, the third information is used to indicate configuration information of the N radio resources.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communications, comprising:
    receiving first information, the first information being used to indicate N Channel Status Information (CSI) Reporting Settings, the N CSI Reporting Settings respectively being associated with N radio resources, and N being a positive integer greater than 1;
    receiving second information, the second information being used to indicate J radio resource(s), and J being a positive integer; and
    transmitting M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N;
    wherein the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

2. The method according to claim 1, wherein each of M antenna port group(s) among the N antenna port groups that respectively corresponds(correspond) to the M CSI Reporting Setting(s) is spatially associated with the first antenna port group.

3. The method according to claim 1, wherein when at least one antenna port group of M antenna port group(s) among the N antenna port groups that respectively corresponds (correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

4. The method according to claim 2, comprising:
    transmitting K piece(s) of CSI in a second radio resource, the K piece(s) of CSI respectively corresponding to K CSI Reporting Setting(s) among the N CSI Reporting Settings other than the M CSI Reporting Setting(s), K being a positive integer no greater than N−M;
    wherein the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group.

5. The method according to claim 1, comprising: performing an access detection to determine the first radio resource out of the J radio resources, wherein the J is greater than 1;
    or, a reference CSI Reporting Setting is a CSI Reporting Setting with a highest reference priority among the N CSI Reporting Settings, and a reference antenna port group is one of the N antenna port groups corresponding to one of the N radio resources that is associated with the reference CSI Reporting Setting, the reference antenna port group being associated with the first antenna port group;
    or, the second information is used to indicate J antenna port groups, the J radio resources respectively correspond to the J antenna port groups, and the first antenna port group is an antenna port group corresponding to the first radio resource among the J antenna port groups;
    or, comprising: receiving third information; wherein the third information is used to indicate configuration information of the N radio resources.

6. A method in a base station for wireless communications, comprising:
    transmitting first information, the first information being used to indicate N Channel Status Information (CSI) Reporting Settings, the N CSI Reporting Settings respectively being associated with N radio resources, and N being a positive integer greater than 1;
    transmitting second information, the second information being used to indicate J radio resource(s), and J being a positive integer; and
    receiving M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N;
    wherein the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

7. The method according to claim 6, wherein each of M antenna port group(s) among the N antenna port groups that respectively corresponds(correspond) to the M CSI Reporting Setting(s) is spatially associated with the first antenna port group.

8. The method according to claim 6, wherein when at least one antenna port group of M antenna port group(s) among the N antenna port groups that respectively corresponds (correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

9. The method according to claim 7, comprising:
receiving K piece(s) of CSI in a second radio resource, the K piece(s) of CSI respectively corresponding to K CSI Reporting Setting(s) among the N CSI Reporting Settings other than the M CSI Reporting Setting(s), K being a positive integer no greater than N−M;
wherein the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group.

10. The method according to claim 6, comprising: monitoring the J radio resources to determine the first radio resource; wherein a receiver of the first information performs an access detection to determine the first radio resource out of the J radio resources, the J being greater than 1;
or, a reference CSI Reporting Setting is a CSI Reporting Setting with a highest reference priority among the N CSI Reporting Settings, and a reference antenna port group is one of the N antenna port groups corresponding to one of the N radio resources that is associated with the reference CSI Reporting Setting, the reference antenna port group being associated with the first antenna port group;
or, the second information is used to indicate J antenna port groups, the J radio resources respectively correspond to the J antenna port groups, and the first antenna port group is an antenna port group corresponding to the first radio resource among the J antenna port groups;
or, comprising: transmitting third information; wherein the third information is used to indicate configuration information of the N radio resources.

11. A UE for wireless communications, comprising:
a first receiver, which receives first information, the first information being used to indicate N Channel Status Information (CSI) Reporting Settings, the N CSI Reporting Settings respectively being associated with N radio resources, and N being a positive integer greater than 1; and receives second information, the second information being used to indicate J radio resource(s), and J being a positive integer; and
a first transmitter, which transmits M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N;
wherein the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

12. The UE according to claim 11, wherein each of M antenna port group(s) among the N antenna port groups that respectively corresponds(correspond) to the M CSI Reporting Setting(s) is spatially associated with the first antenna port group.

13. The UE according to claim 11, wherein when at least one antenna port group of M antenna port group(s) among the N antenna port groups that respectively corresponds (correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

14. The UE according to claim 12, wherein the first transmitter comprises transmitting K piece(s) of CSI in a second radio resource, the K piece(s) of CSI respectively corresponding to K CSI Reporting Setting(s) among the N CSI Reporting Settings other than the M CSI Reporting Setting(s), K being a positive integer no greater than N−M; wherein the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group.

15. The UE according to claim 11, wherein the first receiver performs an access detection to determine the first radio resource out of the J radio resources, wherein the J is greater than 1;
or, a reference CSI Reporting Setting is a CSI Reporting Setting with a highest reference priority among the N CSI Reporting Settings, and a reference antenna port group is one of the N antenna port groups corresponding to one of the N radio resources that is associated with the reference CSI Reporting Setting, the reference antenna port group being associated with the first antenna port group;
or, the second information is used to indicate J antenna port groups, the J radio resources respectively correspond to the J antenna port groups, and the first antenna port group is an antenna port group corresponding to the first radio resource among the J antenna port groups;
or, the first receiver receives third information; wherein the third information is used to indicate configuration information of the N radio resources.

16. A base station for wireless communications, comprising:
a second transmitter, which transmits first information, the first information being used to indicate N Channel Status Information (CSI) Reporting Settings, the N CSI Reporting Settings respectively being associated with N radio resources, and N being a positive integer greater than 1; and transmits second information, the second information being used to indicate J radio resource(s), and J being a positive integer; and a second receiver, which receives M piece(s) of CSI in a first radio resource, the M piece(s) of CSI respectively corresponding to M CSI Reporting Setting(s) among the N CSI Reporting Settings, the first radio resource being one of the J radio resource(s), and M being a positive integer no greater than the N;

wherein the first radio resource corresponds to a first antenna port group, the N radio resources respectively correspond to N antenna port groups, and whether the N antenna port groups are spatially associated with the first antenna port group is used to determine the M CSI Reporting Setting(s) out of the N CSI Reporting Settings.

17. The base station according to claim 16, wherein each of M antenna port group(s) among the N antenna port groups that respectively corresponds(correspond) to the M CSI Reporting Setting(s) is spatially associated with the first antenna port group.

18. The base station according to claim 16, wherein when at least one antenna port group of M antenna port group(s) among the N antenna port groups that respectively corresponds(correspond) to the M CSI Reporting Setting(s) is not spatially associated with the first antenna port group, the M CSI Reporting Setting(s) comprises(comprise) CSI Reporting Setting(s) among the N CSI Reporting Settings of which each corresponds to one of the N antenna port groups that is spatially associated with the first antenna port group.

19. The base station according to claim 17, wherein the second receiver receives K piece(s) of CSI in a second radio resource, the K piece(s) of CSI respectively corresponding to K CSI Reporting Setting(s) among the N CSI Reporting Settings other than the M CSI Reporting Setting(s), K being a positive integer no greater than N−M; wherein the second radio resource is one of the J radio resources other than the first radio resource, and the second radio resource corresponds to a second antenna port group; any of the M antenna port group(s) is not spatially associated with the second antenna port group; K radio resource(s) among the N radio resources associated with the K CSI Reporting Setting(s) respectively corresponds(correspond) to K antenna port group(s) among the N antenna port groups, each of the K antenna port group(s) is spatially associated with the second antenna port group, and none of the K antenna port group(s) is spatially associated with the first antenna port group.

20. The base station according to claim 16, the second receiver monitors the J radio resources to determine the first radio resource; wherein a receiver of the first information performs an access detection to determine the first radio resource out of the J radio resource, the J being greater than 1;

or, a reference CSI Reporting Setting is a CSI Reporting Setting with a highest reference priority among the N CSI Reporting Settings, and a reference antenna port group is one of the N antenna port groups corresponding to one of the N radio resources that is associated with the reference CSI Reporting Setting, the reference antenna port group being associated with the first antenna port group;

or, the second information is used to indicate J antenna port groups, the J radio resources respectively correspond to the J antenna port groups, and the first antenna port group is an antenna port group corresponding to the first radio resource among the J antenna port groups;

or, the second transmitter transmits third information; wherein the third information is used to indicate configuration information of the N radio resources.

* * * * *